United States Patent
Matsumoto et al.

[11] Patent Number: 5,982,911
[45] Date of Patent: Nov. 9, 1999

[54] BRAILLE RECOGNITION SYSTEM

[75] Inventors: Kiyoshi Matsumoto, Izumi; Naotaka Yasuda, Kawachinagano; Tadahiko Yabu, Hirakata, all of Japan

[73] Assignee: Sanyo Electric Co., Ltd., Osaka, Japan

[21] Appl. No.: 08/663,390

[22] Filed: Jun. 13, 1996

[30] Foreign Application Priority Data

| May 26, 1995 | [JP] | Japan | 7-127873 |
| Jun. 14, 1995 | [JP] | Japan | 7-147386 |
| Jun. 20, 1995 | [JP] | Japan | 7-152853 |
| Oct. 30, 1995 | [JP] | Japan | 7-282248 |
| Oct. 30, 1995 | [JP] | Japan | 7-282249 |
| Jan. 24, 1996 | [JP] | Japan | 8-009887 |

[51] Int. Cl.$^6$ .................................................... G06K 9/00
[52] U.S. Cl. .......................... 382/114; 434/112; 434/113; 434/114; 348/62
[58] Field of Search ................................ 382/114, 108, 382/182; 434/112, 113, 114; 348/62

[56] References Cited

U.S. PATENT DOCUMENTS

| 2,866,279 | 12/1958 | Surber | 382/114 |
| 3,640,368 | 2/1972 | Weinberger | 197/6.1 |
| 4,972,501 | 11/1990 | Horyu | 382/114 |
| 5,103,485 | 4/1992 | Yamada | 382/114 |

OTHER PUBLICATIONS

Oyama, Yoshifumi et al., "Development of Braille Reading System by Optical Sensing," Den–O–Ken Technical Report, vol. 4, No. 1, Mar. 1995, pp. 10–12 (English Translation).

Oyama, Yoshifumi et al., "Charater Recognition of Convex and Concave Hybrid Braille Points and Estimation of Deteriorated Braille Points," Journal of Electronics, Information & Communication Engineer Institute, D–II, vol. J79–D–II, No. 5, May 1996, pp. 727–736 (English Translation).

*Primary Examiner*—Andrew W. Johns
*Assistant Examiner*—Hieu C. Le
*Attorney, Agent, or Firm*—Nikaido, Marmelstein, Murray & Oram LLP

[57] ABSTRACT

In a braille recognition system according to the present invention, light is obliquely irradiated onto the surface of a document in braille, and its reflected light is received by imaging means, to obtain a gray image. An image corresponding to a pattern of projected points on the document in braille is obtained on the basis of the obtained gray image. An image is then cut in braille units from the image corresponding to the pattern of projected points. A braille code is generated for each cut image in the braille unit.

13 Claims, 32 Drawing Sheets

FIG. 10

| 0 | −1 | 0 |
|---|----|---|
| 0 | 0  | 0 |
| 0 | 1  | 0 |

FIG. 11

| A | B | C |
|---|---|---|
| D | E | F |
| G | H | I |

FIG. 12

| 0 | 1  | 0 |
|---|----|---|
| 0 | 0  | 0 |
| 0 | −1 | 0 |

FIG. 21

| | |
|---|---|
| $x_{00}', y_{00}'$ | $x_{00}, y_{00}$ |
| $x_{10}', y_{10}'$ | $x_{10}, y_{10}$ |
| $x_{20}', y_{20}'$ | $x_{20}, y_{20}$ |
| ⋮ | |
| $x_{m0}', y_{m0}'$ | $x_{m0}, y_{m0}$ |
| $x_{01}', y_{01}'$ | $x_{01}, y_{01}$ |
| $x_{11}', y_{11}'$ | $x_{11}, y_{11}$ |
| ⋮ | |
| $x_{m1}', y_{m1}'$ | $x_{m1}, y_{m1}$ |
| $x_{02}', y_{02}'$ | $x_{02}, y_{02}$ |
| ⋮ | |
| $x_{mn}', y_{mn}'$ | $x_{mn}, y_{mn}$ |

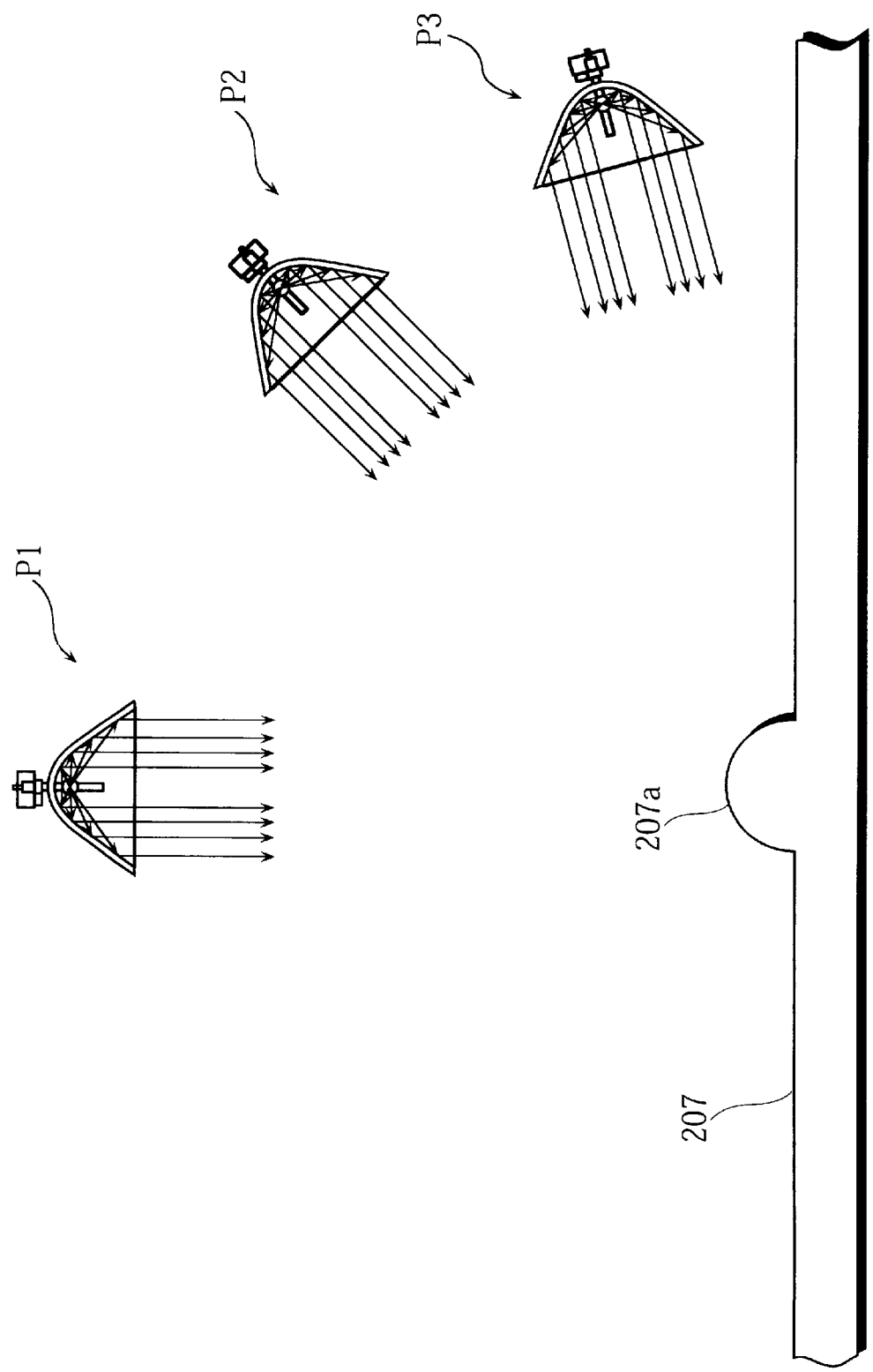

BRAILLE RECOGNITION SYSTEM

BACKGROUND OF THE INVENTION

1. Field of the Invention

The present invention relates to a braille recognition system.

2. Description of the Prior Art

Currently in six-point braille generally employed, six points comprising three columns of points and two rows of points are taken as one unit, and characters are constructed by a combination of the projected points. This unit is referred to as a "masu".

In each masu, the projected point in the uppermost stage of the left column, the projected point in the intermediate stage of the left column, the projected point in the lowermost stage of the left column, the projected point in the uppermost stage of the right column, the projected point in the intermediate stage of the right column, and the projected point in the lowermost stage of the right column are respectively referred to as point ①, point ②, point ③, point ④, point ⑤, and point ⑥.

The spacing W1 between the projected points adjacent to each other in the lateral direction in the same masu is generally set to 2.0 to 2.1 mm. Further, the spacing W2 between the projected points adjacent to each other in the lateral direction between adjacent masus is generally set to 3.0 to 3.1 mm.

The braille is horizontal writing, which is read from the left to the right. In the six-point braille, 63 types of different combinations are possible. However, it is impossible to represent all of kana characters, numeric characters and alphabetic characters by 63 types of combinations. When a numeric character or an alphabetic character is represented, therefore, a code referred to as a pre-code for identifying a character system is assigned ahead of the numeric character or the alphabetic character.

A character on printed matter is referred to as a character in India ink, in contrast with braille. As a code corresponding to the braille, NABCC (North American Braille Computer Code) is generally used.

The braille is represented by projected points, unlike a general character. The braille is represented by the presence or absence of the six projected points. Therefore, the applicant of the present invention has developed a braille recognition system using a recognition method different from a general character recognition method, to file an application (Japanese Patent Application No. 1995/152853). Thereafter, the applicant has continued the research, to develop a method of automatically recognizing braille on the surface and the reverse surface of a document in braille having braille printed on both its surfaces from a picked-up image on one of the surfaces of the document in braille.

SUMMARY OF THE INVENTION

An object of the present invention is to provide a braille recognition system for automatically reading braille, to automatically generate a code or a character in India ink corresponding to the braille.

Another object of the present invention is to provide a braille recognition system for automatically reading, on the basis of a picked-up image corresponding to one surface of a document in braille having braille printed on both its surfaces, the braille on both the surfaces of the document in braille, to automatically generate a code or a character in India ink corresponding to the braille.

Still another object of the present invention is to provide a braille copying apparatus for reading braille on a document in braille and automatically recognizing the braille, to produce a duplicate of the document in braille on the basis of the results of the recognition.

A first braille recognition system according to the present invention comprises imaging means for obliquely irradiating light onto the surface of a document in braille and receiving its reflected light, to obtain a gray image, pattern image producing means for obtaining an image corresponding to a pattern of projected points on the document in braille on the basis of the gray image obtained by the imaging means, braille image cutting means for cutting an image in braille units from the image corresponding to the pattern of projected points, and braille/code converting means for generating a braille code for each cut image in the braille unit.

There may be provided code/India-ink character converting means for converting the braille code obtained by the braille/code converting means into a character in India ink.

Examples of the pattern image producing means include one comprising filtering processing means for subjecting the gray image obtained by the imaging means to filtering processing, to extract a portion intermediate between a portion onto which light is intensely irradiated at the projected point and a portion where a shadow is formed on the document in braille, and binary-coding processing means for subjecting an image after the filtering processing to binary-coding processing, to obtain a binary-coded image corresponding to the pattern of projected points on the document in braille.

When the portion onto which light is intensely irradiated at the projected point and the portion where a shadow is formed on the document in braille are respectively defined as the upper side and the lower side on the gray image obtained by the imaging means, examples of the filtering processing means include one for converting the density value of a target pixel into a value obtained by subtracting the density value of a pixel directly above the target pixel from the density value of a pixel directly below the target pixel.

Examples of the braille image cutting means include one comprising projection processing means for subjecting the image corresponding to the pattern of projected points to projection processing, information extracting means for extracting information relating to the length and the breadth of each of the braille units and information relating to the position of each of the braille units on the basis of the results of the projection processing by the projection processing means, and means for cutting an image in braille units from the image corresponding to the pattern of projected points on the basis of the extracted information.

Examples of the projection processing means include one comprising means for performing projection processing in a first direction which is the same as the direction in which braille is read in the image corresponding to the pattern of projected points, and means for performing projection processing in a direction perpendicular to the direction in which braille is read in the image corresponding to the pattern of projected points.

Examples of the braille/code converting means include one comprising judging means for dividing the cut image in the braille unit into a plurality of regions where a projected point can be formed and judging the presence or absence of a projected point for each region obtained by the division, and code generating means for generating a braille code corresponding to the cut image in the braille unit on the basis of the results of the judgment of the presence or absence of a projected point for each region obtained by the division and a weighting factor previously determined for each region obtained by the division.

Examples of the judging means include one for judging the presence or absence of a projected point for each region obtained by the division on the basis of the number of significant pixels in the region obtained by the division or the number of significant pixels in a small region set in the region obtained by the division.

In the first braille recognition system according to the present invention, it is possible to automatically read braille to automatically generate a code or a character in India ink corresponding to the braille.

A second braille recognition system according to the present invention comprises imaging means for obliquely irradiating light onto one surface of a document in braille having braille printed on both its surfaces and receiving its reflected light, to obtain a gray image, pattern image producing means for producing an image corresponding to a pattern of projected points on the surface onto which light is irradiated out of both the surfaces of the document in braille and an image corresponding to a pattern of projected points on the reverse surface of the document in braille which appear as recessed points on the surface of the document in braille, braille image cutting means for cutting, for each image corresponding to the pattern of projected points on the surface of the document in braille and image corresponding to the pattern of projected points on the reverse surface of the document in braille, an image in braille units from the obtained images corresponding to the pattern of projected points, and braille/code converting means for generating a braille code for each image in the braille unit cut on the basis of the image corresponding to the pattern of projected points on the surface of the document in braille to generate a braille code corresponding to the braille on the surface, and generating a braille code for each image in the braille unit cut on the basis of the image corresponding to the pattern of projected points on the reverse surface of the document in braille to generate a braille code corresponding to the braille on the reverse surface.

In a picked-up image on one surface of the document in braille having braille printed on both its surfaces, the projected points constituting the braille printed on the surface of the document in braille appear, and the projected points constituting the braille printed on the reverse surface thereof appear as recessed points. In the second braille recognition system according to the present invention, the image corresponding to the pattern of projected points on the surface of the document in braille and the image corresponding to the pattern of projected points on the reverse surface of the document in braille which appear as recessed points are respectively produced from the picked-up image, whereby the braille on the surface and the braille on the reverse surface of the document in braille are respectively automatically recognized.

There may be provided code/India-ink character converting means for converting the braille code obtained by the braille/code converting means into a character in India ink.

The pattern image producing means comprises first image producing means for producing an image corresponding to a pattern of projected points on the surface of the document in braille and second image producing means for producing an image corresponding to a pattern of projected points on the reverse surface of the document in braille which appear as recessed points on the surface of the document in braille.

Examples of the first image producing means include one comprising first filtering processing means for subjecting the gray image obtained by the imaging means to first filtering processing, to extract a portion intermediate between a portion onto which light is intensely irradiated at the projected point and a portion where a shadow is formed on the surface of the document in braille to produce an image for extracting projected points, second filtering processing means for subjecting the gray image obtained by the imaging means to second filtering processing, to extract a portion intermediate between a portion onto which light is intensely irradiated at the recessed point and a portion where a shadow is formed on the surface of the document in braille to produce an image for extracting recessed points, first binary-coding processing means for subjecting the image for extracting projected points to binary-coding processing using a relatively loose threshold value, to produce a first binary-coded image, second binary-coding processing means for subjecting the image for extracting recessed points to binary-coding processing using a relatively strict threshold value, to produce a second binary-coded image, expansion processing means for subjecting the second binary-coded image to expansion processing, to produce a binary-coded image whose recessed point portions are expanded, reversal processing means for subjecting the binary-coded image whose recessed point portions are expanded to black-and-white reversal processing, to produce a first mask image, and means for calculating the logical product between the first binary- coded image and the first mask image, to produce the image corresponding to the pattern of projected points on the surface of the document in braille.

Examples of the second image producing means include one comprising first filtering processing means for subjecting the gray image obtained by the imaging means to first filtering processing, to extract a portion intermediate between a portion onto which light is intensely irradiated at the projected point and a portion where a shadow is formed on the surface of the document in braille to produce an image for extracting projected points, second filtering processing means for subjecting the gray image obtained by the imaging means to second filtering processing, to extract a portion intermediate between a portion onto which light is intensely irradiated at the recessed point and a portion where a shadow is formed on the surface of the document in braille to produce an image for extracting recessed points, third binary-coding processing means for subjecting the image for extracting recessed points to binary-coding processing using a relatively loose threshold value, to produce a third binary-coded image, fourth binary-coding processing means for subjecting the image for extracting projected points to binary-coding processing using a relatively strict threshold value, to produce a fourth binary-coded image, expansion processing means for subjecting the fourth binary-coded image to expansion processing, to produce a binary-coded image whose projected point portions are expanded, reversal processing means for subjecting the binary-coded image whose projected point portions are expanded to black-and-white reversal processing, to produce a second mask image, and means for calculating the logical product between the third binary-coded image and the second mask image, to produce the image corresponding to the pattern of projected points on the reverse surface of the document in braille.

When the image corresponding to the pattern of projected points on the surface of the document in braille is produced, the recessed points appearing on the surface of the document in braille may appear as noise. On the contrary, when an attempt is made to produce the image corresponding to the pattern of projected points on the reverse surface of the document in braille which appear as the recessed points on the surface of the document in braille, the projected points on the surface of the document in braille may appear as noise.

If the first image producing means and the second image producing means are used as the pattern image producing means, it is possible to produce the image corresponding to the pattern of projected points on the surface of the document in braille on which recessed points do not appear as noise, and the image corresponding to the pattern of projected points on the reverse surface of the document in braille on which projected points on the reverse surface of the document in braille do not appear as noise.

Examples of the first filtering processing means include one for converting the density value of a target pixel into a value obtained by subtracting the density value of a pixel directly above the target pixel from the density value of a pixel directly below the target pixel when the portion onto which light is intensely irradiated at the projected point and the portion where a shadow is formed on the surface of the document in braille are respectively defined as the upper side and the lower side on the gray image obtained by the imaging means.

Examples of the second filtering processing means include one for converting the density value of a target pixel into a value obtained by subtracting the density value of a pixel directly below the target pixel from the density value of a pixel directly above the target pixel when the portion onto which light is intensely irradiated at the recessed point and the portion where a shadow is formed on the surface of the document in braille are respectively defined as the lower side and the upper side on the gray image obtained by the imaging means.

Examples of the braille image cutting means include one comprising projection processing means for subjecting the image corresponding to the pattern of projected points to projection processing, information extracting means for extracting information relating to the length and the breadth of each of the braille units and information relating to the position of each of the braille units on the basis of the results of the projection processing by the projection processing means, and means for cutting an image in braille units from the image corresponding to the pattern of projected points.

Examples of the projection processing means include one comprising means for performing projection processing in a first direction which is the same as the direction in which braille is read in the image corresponding to the pattern of projected points, and means for performing projection processing in a direction perpendicular to the direction in which braille is read in the image corresponding to the pattern of projected points.

Examples of the information extracting means include one comprising means for extracting information relating to the length and the breadth of each of the braille units, the pitch in the horizontal direction between the braille units, the pitch in the vertical direction between the braille units, and the positions of the braille units at four corners on the basis of the results of the projection processing by the projection processing means, means for calculating information relating to the positions of all the braille units on the basis of the information relating to the positions of the braille units at four corners, the pitch in the horizontal direction between the braille units, and the pitch in the vertical direction between the braille units, and means for correcting the information relating to the calculated positions of all the braille units on the basis of a position conversion table previously produced in order to correct the optical distortion of the imaging means.

Examples of the braille/code converting means include one comprising judging means for dividing the cut image in the braille unit into a plurality of regions where a projected point can be formed and judging the presence or absence of a projected point for each region obtained by the division, and code generating means for generating a braille code corresponding to the cut image in the braille unit on the basis of the results of the judgment of the presence or absence of a projected point for each region obtained by the division and a weighting factor previously determined for each region obtained by the division.

Examples of the judging means include one for judging the presence or absence of a projected point for each region obtained by the division on the basis of the number of significant pixels in the region obtained by the division and the number of significant pixels in a small region set in the region obtained by the division.

In the second braille recognition system according to the present invention, it is possible to automatically read braille on both surfaces of the document in braille on the basis of the picked-up image corresponding to one surface of the document in braille having braille printed on both its surfaces, to automatically generate a code or a character in India ink corresponding to the braille.

A first braille copying apparatus according to the present invention comprises imaging means for obliquely irradiating light onto the surface of a document in braille and receiving its reflected light, to obtain a gray image, pattern image producing means for obtaining an image corresponding to a pattern of projected points on the document in braille on the basis of the gray image obtained by the imaging means, braille image cutting means for cutting an image in braille units from the image corresponding to the pattern of projected points, braille/code converting means for generating a braille code for each cut image in the braille unit, and braille document producing means for producing a document in braille on the basis of the generated braille code.

In a picked-up image on one surface of the document in braille, the projected points constituting the braille printed on the surface appear. In the first braille copying apparatus according to the present invention, the image corresponding to the pattern of projected points on the surface of the document in braille is produced from the produced picked-up image. The image is cut in braille units from the image corresponding to the pattern of projected points. The braille code is generated for each cut image in the braille unit. The document in braille is produced on the basis of the generated braille code. Consequently, a duplicate of the document in braille is obtained.

Examples of the pattern image producing means include one comprising filtering processing means for subjecting the gray image obtained by the imaging means to filtering processing, to extract a portion intermediate between a portion onto which light is intensely irradiated at the projected point and a portion where a shadow is formed on the document in braille, and binary-coding processing means for subjecting an image after the filtering processing to binary-coding processing to obtain a binary-coded image corresponding to the pattern of projected points on the document in braille.

When the portion onto which light is intensely irradiated at the projected point and the portion where a shadow is formed on the document in braille are respectively defined as the upper side and the lower side on the gray image obtained by the imaging means, examples of the filtering processing means include one for converting the density value of a target pixel into a value obtained by subtracting the density value of a pixel directly above the target pixel from the density value of a pixel directly below the target pixel.

A second braille copying apparatus according to the present invention comprises imaging means for obliquely irradiating light onto one surface of a document in braille having braille printed on both its surfaces and receiving its reflected light, to obtain a gray image, pattern image producing means for producing an image corresponding to a pattern of projected points on the surface onto which light is irradiated out of both the surfaces of the document in braille and an image corresponding to a pattern of projected points on the reverse surface of the document in braille which appear as recessed points on the surface of the document in braille, braille image cutting means for cutting, for each image corresponding to the pattern of projected points on the surface of the document in braille and image corresponding to the pattern of projected points on the reverse surface of the document in braille, an image in braille units from the obtained images corresponding to the pattern of projected points, braille/code converting means for generating a braille code for each image in the braille unit cut on the basis of the image corresponding to the pattern of projected points on the surface of the document in braille to generate a braille code corresponding to the braille on the surface, and generating a braille code for each image in the braille unit cut on the basis of the image corresponding to the pattern of projected points on the reverse surface of the document in braille to generate a braille code corresponding to the braille on the reverse surface, and braille document producing means for producing a document in braille on the basis of the generated braille code corresponding to the braille on the surface, and producing a document in braille on the basis of the generated braille code corresponding to the braille on the reverse surface.

In a picked-up image on one surface of the document in braille having braille printed on both its surfaces, the projected points constituting the braille printed on the surface of the document in braille appear, and the projected points constituting the braille printed on the reverse surface thereof appear as the recessed points. In the second braille copying apparatus according to the present invention, the image corresponding to the pattern of projected points on the surface of the document in braille and the image corresponding to the pattern of projected points on the reverse surface of the document in braille which appear as recessed points are respectively produced. The image is cut in braille units from the obtained image corresponding to the pattern of projected points for each image corresponding to the pattern of projected points on the surface of the document in braille and image corresponding to the pattern of projected points on the reverse surface of the document in braille.

The braille code is generated for each image in the braille unit cut on the basis of the image corresponding to the pattern of projected points on the surface of the document in braille, whereby the braille code corresponding to the braille on the surface is generated. The braille code is generated for each image in the braille unit cut on the basis of the image corresponding to the pattern of projected points on the reverse surface of the document in braille, whereby the braille code corresponding to the braille on the reverse surface is generated. The document in braille is produced on the basis of the braille code corresponding to the produced braille on the surface, and the document in braille is produced on the basis of the braille code corresponding to the produced braille on the reverse surface. Consequently, a duplicate of the document in braille is obtained.

The pattern image producing means in the second braille copying apparatus according to the present invention comprises first image producing means for producing an image corresponding to a pattern of projected points on the surface of the document in braille and second image producing means for producing an image corresponding to a pattern of projected points on the reverse surface of the document in braille which appear as recessed points on the surface of the document in braille.

Examples of the first image producing means include one comprising first filtering processing means for subjecting the gray image obtained by the imaging means to first filtering processing, to extract a portion intermediate between a portion onto which light is intensely irradiated at the projected point and a portion where a shadow is formed on the surface of the document in braille to produce an image for extracting projected points, second filtering processing means for subjecting the gray image obtained by the imaging means to second filtering processing, to extract a portion intermediate between a portion onto which light is intensely irradiated at the recessed point and a portion where a shadow is formed on the surface of the document in braille to produce an image for extracting recessed points, first binary-coding processing means for subjecting the image for extracting projected points to binary-coding processing using a relatively loose threshold value, to produce a first binary-coded image, second binary-coding processing means for subjecting the image for extracting recessed points to binary-coding processing using a relatively strict threshold value, to produce a second binary-coded image, expansion processing means for subjecting the second binary-coded image to expansion processing, to produce a binary-coded image whose recessed point portions are expanded, reversal processing means for subjecting the binary-coded image whose recessed point portions are expanded to black-and-white reversal processing, to produce a first mask image, and means for calculating the logical product between the first binary-coded image and the first mask image, to produce an image corresponding to the pattern of projected points on the surface of the document in braille.

Examples of the second image producing means include one comprising first filtering processing means for subjecting the gray image obtained by the imaging means to first filtering processing, to extract a portion intermediate between a portion onto which light is intensely irradiated at the projected point and a portion where a shadow is formed on the surface of the document in braille to produce an image for extracting projected points, second filtering processing means for subjecting the gray image obtained by the imaging means to second filtering processing, to extract a portion intermediate between a portion onto which light is intensely irradiated at the recessed point and a portion where a shadow is formed on the surface of the document in braille to produce an image for extracting recessed points, third binary-coding processing means for subjecting the image for extracting recessed points to binary-coding processing using a relatively loose threshold value, to produce a third binary-coded image, fourth binary-coding processing means for subjecting the image for extracting projected points to binary-coding processing using a relatively strict threshold value, to produce a fourth binary-coded image, expansion processing means for subjecting the fourth binary-coded image to expansion processing, to produce a binary-coded image whose projected point portions are expanded, reversal processing means for subjecting the binary-coded image whose projected point portions are expanded to black-and-white reversal processing, to produce a second mask image, and means for calculating the logical product between the third binary-coded image and the second mask image, to produce an image corresponding to the pattern of projected points on the reverse surface of the document in braille.

Examples of the first filtering processing means include one for converting the density value of a target pixel into a value obtained by subtracting the density value of a pixel directly above the target pixel from the density value of a pixel directly below the target pixel when the portion onto which light is intensely irradiated at the projected point and the portion where a shadow is formed on the surface of the document in braille are respectively defined as the upper side and the lower side on the gray image obtained by the imaging means.

Examples of the second filtering processing means include one for converting the density value of a target pixel into a value obtained by subtracting the density value of a pixel directly below the target pixel from the density value of a pixel directly above the target pixel when the portion onto which light is intensely irradiated at the recessed point and the portion where a shadow is formed on the surface of the document in braille are respectively defined as the lower side and the upper side on the gray image obtained by the imaging means.

Examples of the braille image cutting means in the first or second braille copying apparatus according to the present invention include one comprising projection processing means for subjecting the image corresponding to the pattern of projected points to projection processing, information extracting means for extracting information relating to the length and the breadth of each of the braille units and information relating to the position of each of the braille units on the basis of the results of the projection processing by the projection processing means, and means for cutting an image in braille units from the image corresponding to the pattern of projected points on the basis of the extracted information.

Examples of the projection processing means include one comprising means for performing projection processing in a first direction which is the same as the direction in which braille is read in the image corresponding to the pattern of projected points, and means for performing projection processing in a direction perpendicular to the direction in which braille is read in the image corresponding to the pattern of projected points.

Examples of the braille/code converting means in the first or second braille copying apparatus according to the present invention include one comprising judging means for dividing the cut image in the braille unit into a plurality of regions where a projected point can be formed and judging the presence or absence of a projected point for each region obtained by the division, and code generating means for generating a braille code corresponding to the cut image in the braille unit on the basis of the results of the judgment of the presence or absence of a projected point for each region obtained by the division and a weighting factor previously determined for each region obtained by the division.

Examples of the judging means include one for judging the presence or absence of a projected point for each region obtained by the division on the basis of the number of significant pixels in the region obtained by the division or the number of significant pixels in a small region set in the region obtained by the division.

In the first or second braille copying apparatus according to the present invention, it is possible to produce a duplicate of the document in braille.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 10 is a typical diagram showing a filter used in the filtering processing section 61;

FIG. 11 is a typical diagram showing the density values of pixels in a 3×3 matrix centered around a target pixel;

FIG. 12 is a typical diagram showing a filter used in the filtering processing section 62;

FIG. 21 is a typical diagram showing a coordinate conversion table produced on the basis of the original image shown in FIG. 19 and the picked-up image shown in FIG. 20;

FIG. 33 is a typical diagram for explaining the arrangement of an illuminating lamp;

DETAILED DESCRIPTION OF THE PREFERRED EMBODIMENTS

[1] Description of Braille Recognition System

Referring now to FIGS. 1 to 22, a braille recognition system according to an embodiment of the present invention will be described.

Figure 1:
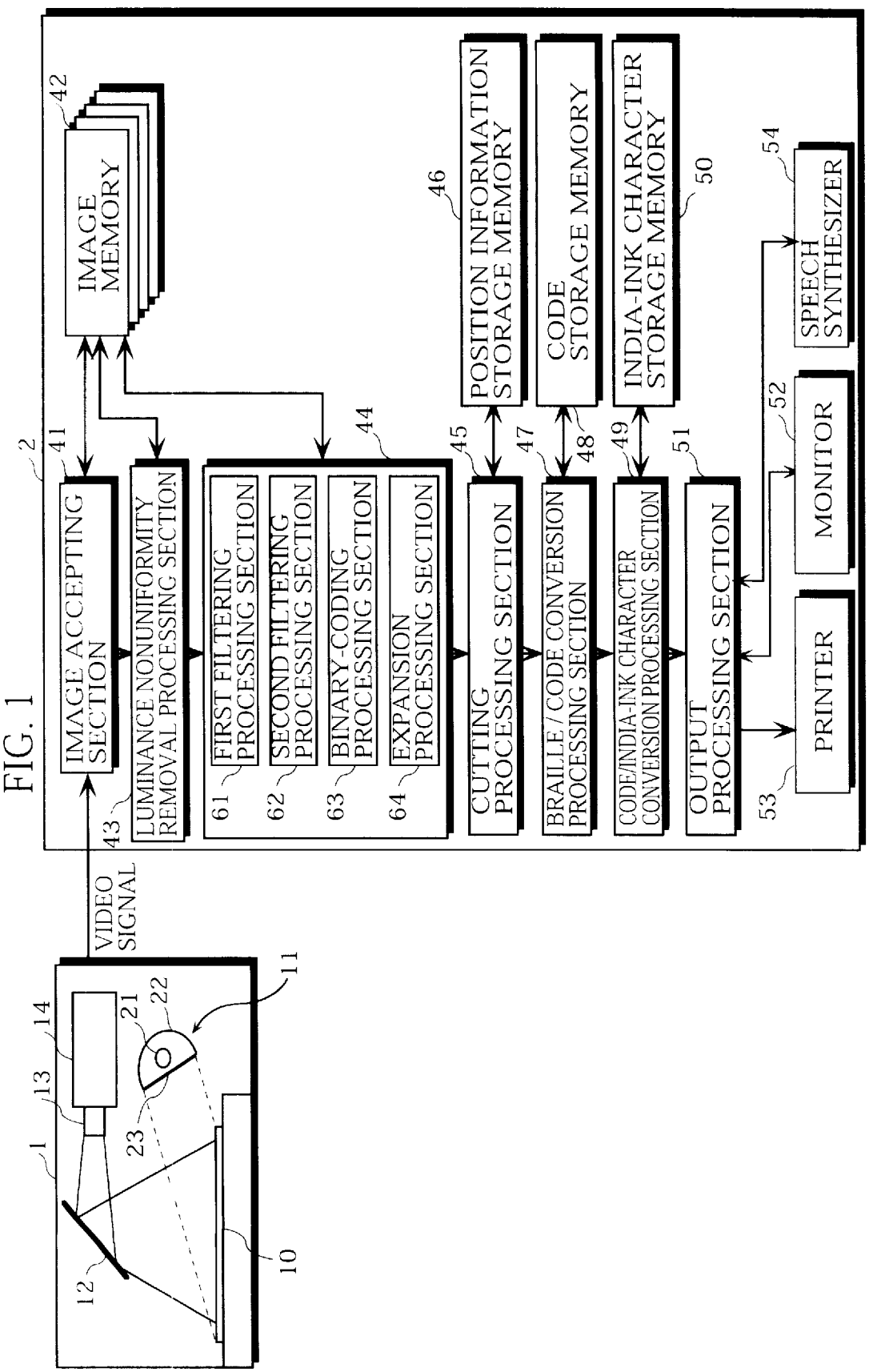
FIG. 1 is a block diagram showing the entire construction of a braille recognition system.

FIG. 1 illustrates the entire construction of a braille recognition system.

Examples of an original having braille printed thereon (hereinafter referred to as a document in braille) include an original having braille printed only on its surface (hereinafter referred to as a document in one-sided braille) and an original having braille printed on both its surfaces (hereinafter referred to as a document in both-sided braille). In the document in one-sided braille, projected points constituting braille appear on the surface. In the document in both-sided braille, projected points constituting braille appear on the surface, and projected points constituting braille appear on the reverse surface. On the surface of the document in both-sided braille, therefore, the projected points constituting the braille on the surface appear, and the projected points constituting the braille on the reverse surface appear as recessed points.

The braille recognition system has a function of recognizing braille on the surface and braille on the reverse surface of a document in both-sided braille without turning the document in both-sided braille over in addition to a function of recognizing braille on a document in one-sided braille.

As an image memory storing an image picked up by a CCD (Charge Coupled Device) camera, an image memory of size composed of 512×512 pixels is generally used. In such an image memory, reading data corresponding to an original in braille of B5 size can be stored in one image memory, while reading data (672 lines×480 dots) corresponding to an original in braille of A4 size cannot be stored in one image memory. In the braille recognition system, therefore, when a braille image is accepted from the original in braille of A4 size, the braille image is accepted in two operations in separate image memories by shifting the position where the braille image is accepted, and the braille images accepted in the separate image memories are synthesized. As described in the foregoing, in the braille recognition system, B5 (standard) and A4 (wide) are selectively set as the size of the document in braille to be read. As the type of the document in braille, an original in one-sided braille and an original in both-sided braille are selectively set. Therefore, examples of a braille recognition mode include the following four modes:

(i) A B5 one-sided mode in which the size of a document in braille is B5, and the document in braille is a document in one-sided braille (ii) A B5 both-sided mode in which the size of a document in braille is B5, and the document in braille is a document in both-sided braille (iii) An A4 one-sided mode in which the size of a document in braille is A4, and the document in braille is a document in one-sided braille (iv) An A4 both-sided mode in which the size of a document in braille is A4, and the document in braille is a document in both-sided braille Description is now made of the construction of the braille recognition system on the basis of FIG. 1. The braille recognition system comprises a braille reading section 1 and a braille recognizing section 2.

The braille reading section 1 comprises a light irradiating section 11 for irradiating light onto a document in braille 10 obliquely from above, and a CCD camera 14 receiving light reflected from the document in braille 10 through a mirror 12 and a lens 13. When the document in braille is a document in one-sided braille, the document in braille is so set that the surface having braille printed thereon is directed upward.

The light irradiating section 11 comprises a light source 21 such as a fluorescent lamp, a reflecting plate 22, and a luminance nonuniformity correcting filter 23. Light emitted toward the luminance nonuniformity correcting filter 23 from the light source 21 and light emitted from the light source 21 and reflected from the reflecting plate 22 are obliquely irradiated onto the surface of the document in braille 10 through the luminance nonuniformity correcting filter 23.

Light is thus irradiated onto the document in braille 10 obliquely from above in order to judge the presence or absence of a projected point constituting braille (a projected point and a recessed point in the case of the document in both-sided braille) depending on a shadow formed by the projected point (the projected point and the recessed point in the case of the document in both-sided braille).

Figure 2:
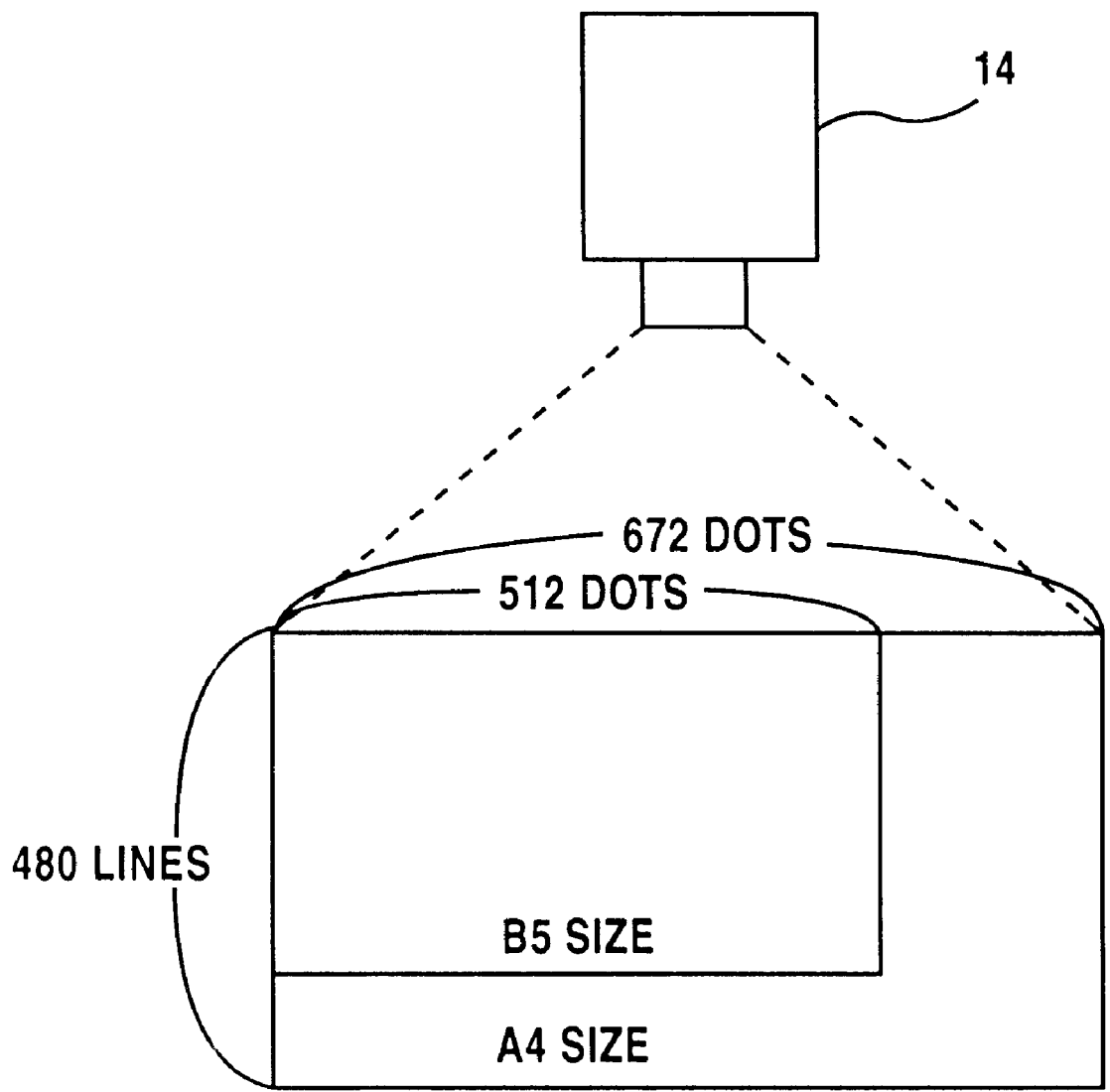
FIG. 2 is a typical diagram showing an imaging area of a CCD camera.
Figure 3:
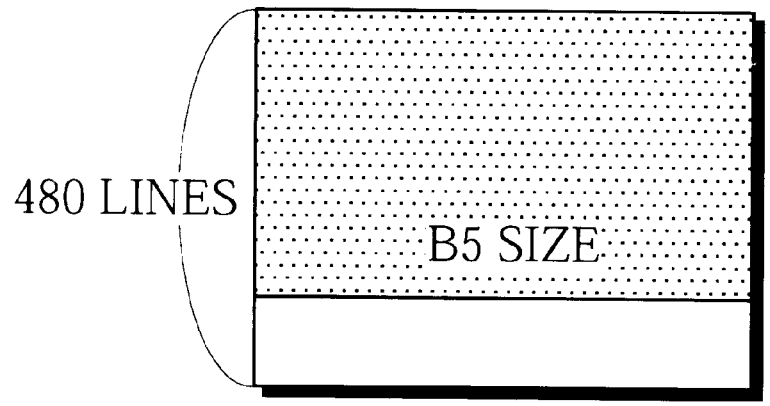
FIG. 3 is a typical diagram showing a region of a read image corresponding to a document in braille of B5 size.

The CCD camera 14 has an imaging area where an original in braille of A4 size can be imaged, as shown in FIG. 2. When B5 is selectively set as the size of the document in braille (the B5 one-sided mode or the B5 both-sided mode), an image corresponding to the entire region of the set document in braille of B5 size is accepted in one operation, as shown in FIG. 3. The size of the accepted image in this case is 512 dots×480 lines.

Figure 4:
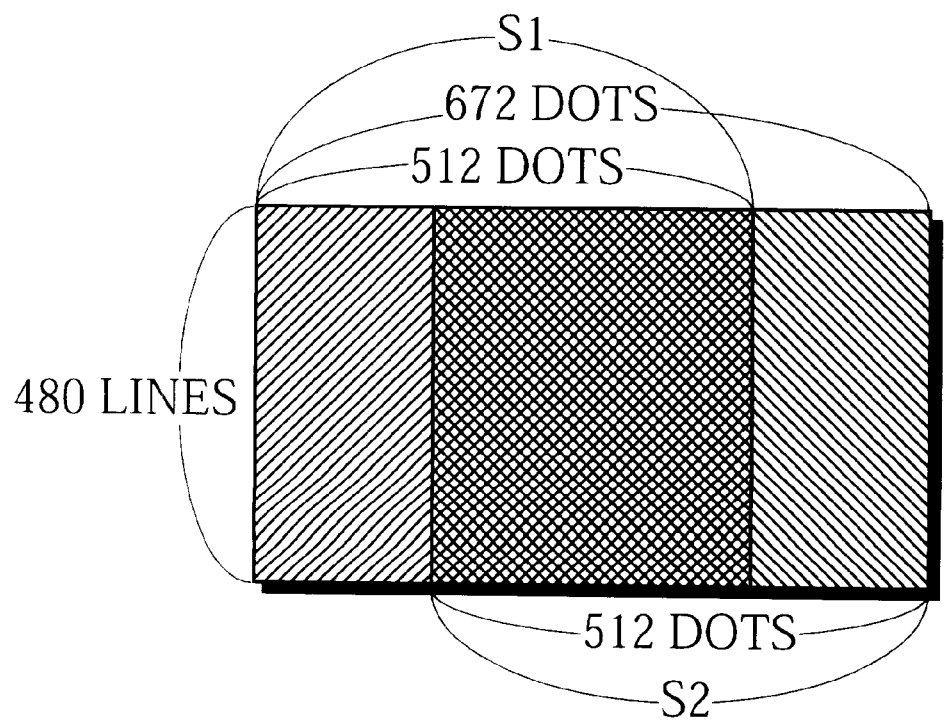
FIG. 4 is a typical diagram for explaining a method of reading an image corresponding to a document in braille of A4 size.

When A4 is selectively set as the size of the document in braille (the A4 one-sided mode or the A4 both-sided mode), an image corresponding to the entire region of the set document in braille of A4 size is accepted in two operations, as shown in FIG. 4. That is, an image corresponding to a first region S1 on the left side and an image corresponding to a second region S2 on the right side the respective centers of which are overlapped with each other are accepted in two operations in separate image memories 42, as shown in FIG. 4. The size of the image corresponding to each of the regions S1 and S2 is 512 dots×480 lines.

Figure 6:
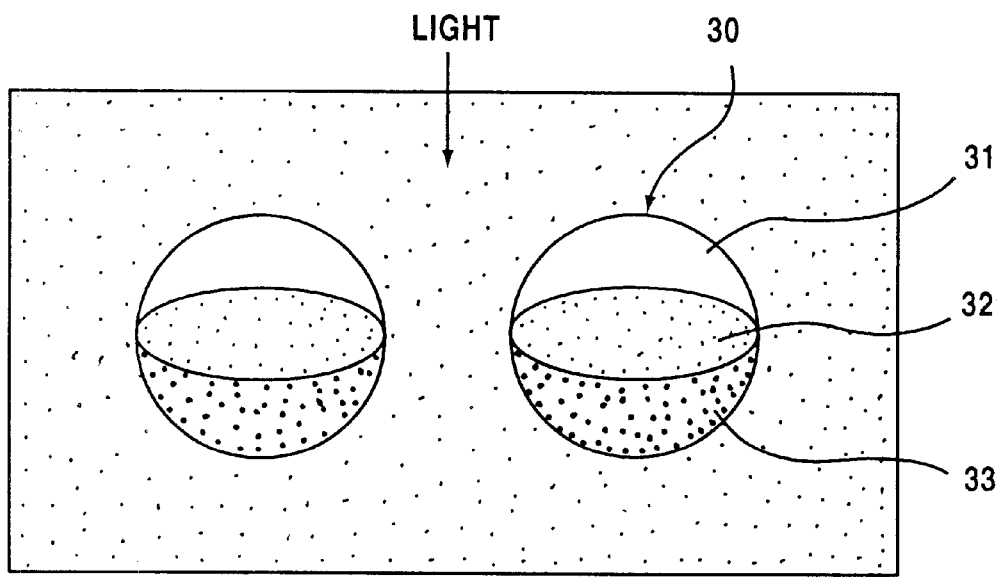
FIG. 6 is a typical diagram showing an image corresponding to projected points imaged by a CCD camera and their periphery.

FIG. 6 illustrates a gray image corresponding to projected points imaged by the CCD camera 14 (braille printed on the surface of the document in braille) and their periphery.

A projected point 30 constituting braille is a hemispherical projection, whereby a shadow is formed in a portion 33 on the opposite side of a portion 31 on which light is incident at the projected point 30. Consequently, the portion 31 on which light is incident at the projected point 30 becomes a color close to white lighter than a background, the portion 33 on the opposite side of the portion 31 on which light is incident becomes a color close to black darker than the background, and an intermediate portion 32 becomes gray which is approximately the same as the background.

Figure 7:
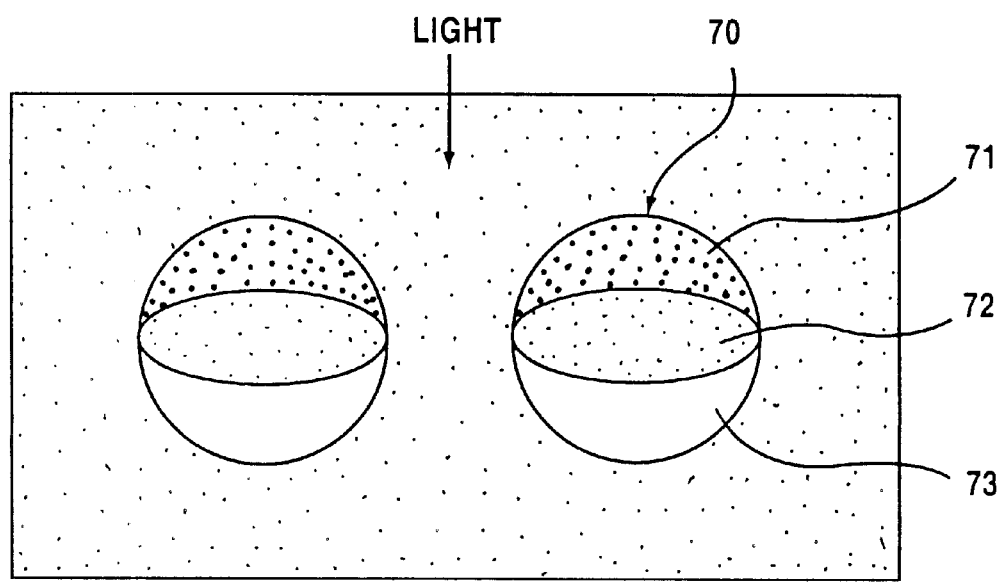
FIG. 7 is a typical diagram showing an image corresponding to recessed points imaged by a CCD camera and their periphery.

FIG. 7 illustrates a gray image corresponding to recessed points imaged by the CCD camera 14 (projected points constituting braille printed on the reverse surface of the document in braille which appear on the surface) and their periphery.

The braille on the reverse surface of the document in braille appears as recessed points on the surface. Since a recessed point 70 is a hemispherical recess, a shadow is formed in a portion 71 on which light is incident at the recessed point 70. A portion 73 on the opposite side of the portion 71 on which light is incident at the recessed point 70 becomes a color close to white lighter than a background, the portion 71 on which light is incident becomes a color close to black darker than the background, and an intermediate portion 72 becomes gray which is approximately the same as the background.

Description is now made of the operations of the braille recognizing section 2. A video signal outputted from the CCD camera 14 is converted into a digital signal (pixel data) in an image accepting section 41, after which the digital signal is stored in an image memory 42. As the image memory 42, an image memory composed of 512×512 pixels is used. A plurality of image memories 42 are provided.

In this example, the digital signal obtained by the image accepting section 41 shall be a signal representing the density value of a gray image by 8 bits. The portion 31 on which light is incident at the projected point 30 (or the portion 73 on the opposite side of the portion 71 on which light is incident at the recessed point 70) takes a value close to a density value "255" representing white, the portion 33 on the opposite side of the portion 31 on which light is incident at the projected point 30 (or the portion 71 on which light is incident at the recessed point 70) takes a value close to a density value "0" representing black, and the intermediate portion 32 (or 72) and the background take values slightly less than the density value of the portion 31 on which light is incident at the projected point 30 (or the portion 73 on the opposite side of the portion 71 on which light is incident at the recessed point 70). In this example, the size of one projected point or one recessed point 70 is approximately 3×3 pixels.

The nonuniformity in luminance of image data stored in the image memory 42 (hereinafter referred to as an accepted image) is then removed by a luminance nonuniformity removal processing section 43.

As shown in FIG. 1, light is obliquely irradiated onto the surface of the document in braille. Even if the luminance nonuniformity correcting filter 23 is provided, therefore, the nonuniformity in luminance easily occurs depending on the position of the document in braille. Consequently, the luminance nonuniformity removal processing section 43 removes the nonuniformity in luminance of the accepted image using an integral filter.

Figure 5A:
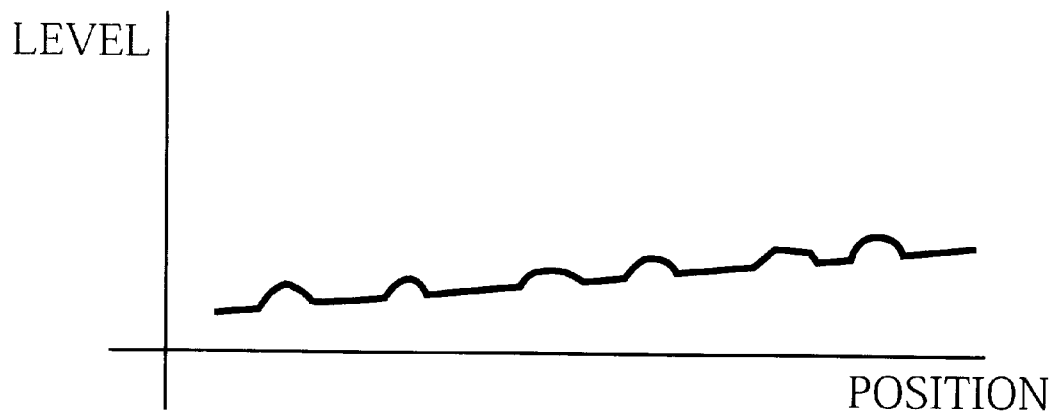
FIGS. 5a to 5c are illustrations for explaining luminance nonuniformity removal processing by a luminance nonuniformity removal processing section.
Figure 5B:
Figure 5C:
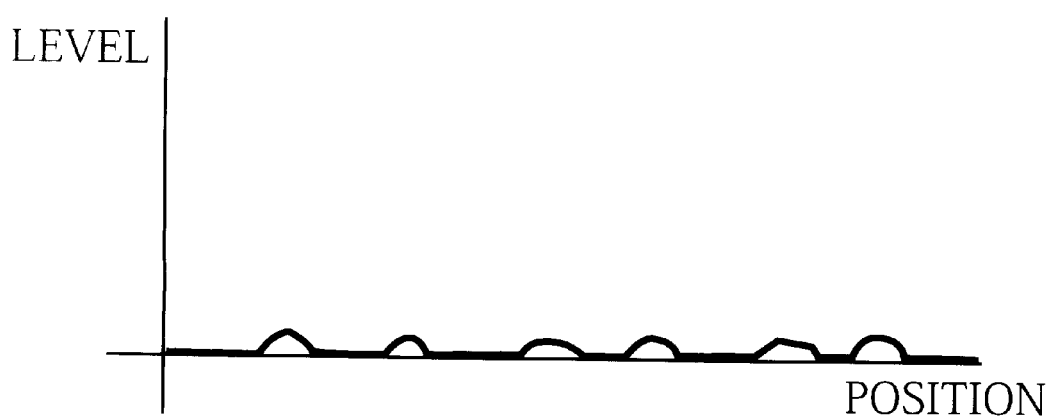

Referring to FIGS. 5a to 5c, description is made of the luminance nonuniformity removal processing by the luminance nonuniformity removal processing section 43. FIG. 5a illustrates the luminance level corresponding to the position in the line direction of the accepted image.

In the luminance nonuniformity removal processing, the accepted image is filtered a plurality of numbers of times using the integral filter, to produce luminance data whose luminance level is averaged, as shown in FIG. 5b.

The difference between the accepted image shown in FIG. 5a and the luminance data whose luminance level is averaged as shown in FIG. 5b is found, to obtain image data whose nonuniformity in luminance is removed, as shown in FIG. 5c.

Examples of the integral filter include a median filter, and an averaging filter. Examples of the median filter include one taking an intermediate value of the values of four or eight pixels in the vicinity of a target pixel as the pixel value of the target pixel. Examples of the averaging filter include one taking the average value of four or eight pixels in the vicinity of the target pixel as the pixel value of the target pixel.

The image data whose nonuniformity in luminance is removed is stored in the image memory 42. The image data whose nonuniformity in luminance is removed is subjected to binary-coded braille image production processing by a binary-coded braille image production processing section (pattern image producing means) 44. The binary-coded braille image production processing section 44 comprises a first filtering processing section 61, a second filtering processing section 62, a binary-coding processing section 63, an expansion processing section 64, and the like.

When a document in one-sided braille is selectively set as the type of the document in braille (the B5 one-sided mode or the A4 one-sided mode), a binary-coded image corresponding to a pattern of projected points appearing on the surface of the document in one-sided braille is produced by first binary-coded braille image production processing.

When a document in both-sided braille is selectively set as the type of the document in braille (the B5 both-sided mode or the A4 both-sided mode), a binary-coded image corresponding to a pattern of projected points appearing on the surface of the document in both-sided braille (a braille pattern image on the surface) is produced by second binary-coded braille image production processing, and a binary-coded image corresponding to a pattern of recessed points appearing on the surface of the document in both-sided braille (a braille pattern image on the reverse surface) is produced by third binary-coded braille image production processing.

Figure 13:
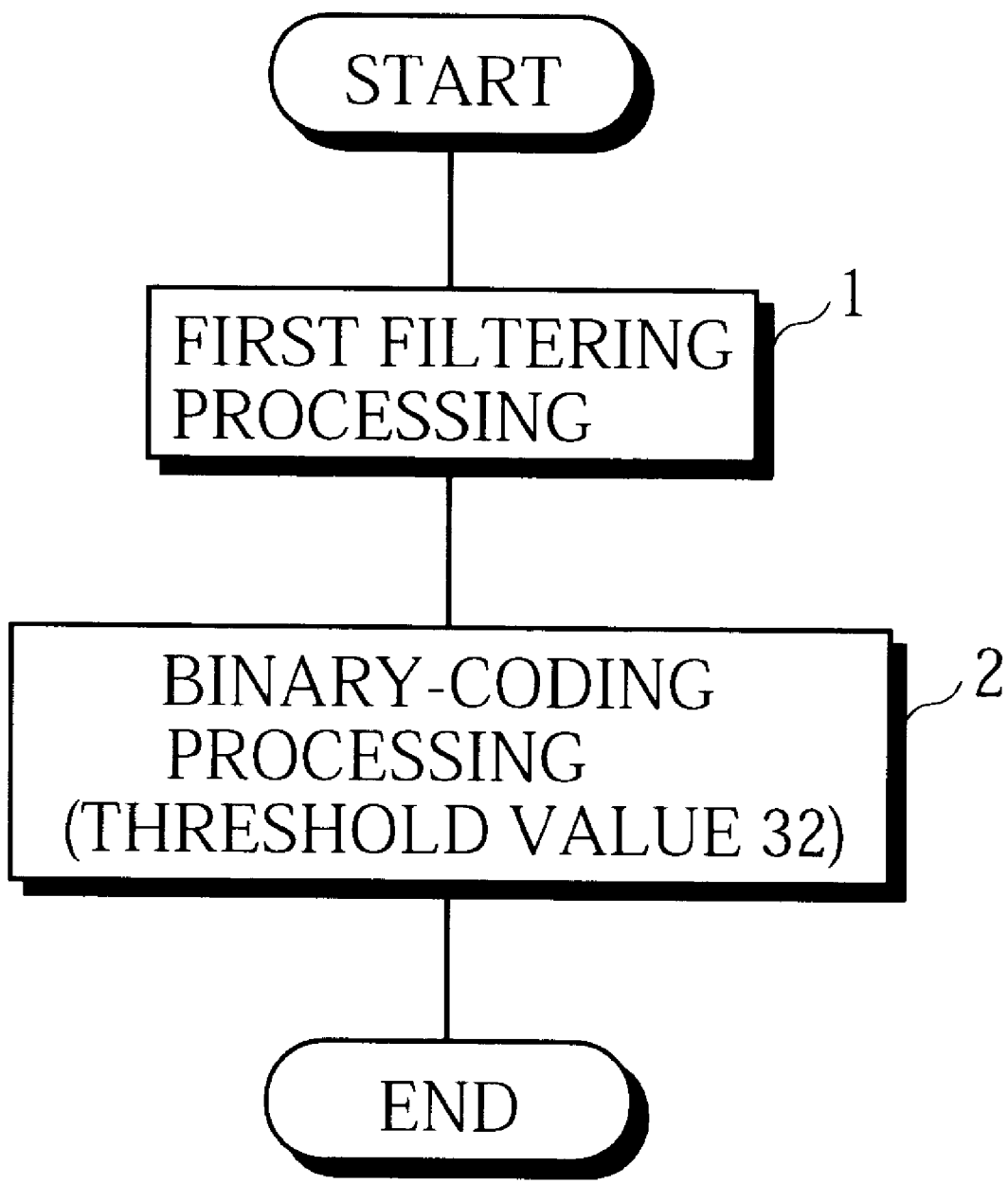
FIG. 13 is a flow chart showing the procedure for first binary-coded braille image production processing.

FIG. 13 shows the procedure for the first binary-coded braille image production processing. An image memory storing image data whose nonuniformity in luminance is removed by the luminance nonuniformity removal processing section 43 shall be referred to as a memory A in convenience of illustration. In the case of the A4 one-sided mode, the image data whose nonuniformity in luminance is removed is stored in two image memories. Also in this case, the two image memories storing the image data whose nonuniformity in luminance is removed shall be generically named a memory A.

The image data stored in the memory A is first subjected to first filtering processing by the first filtering processing section 61 (step 1). In the first filtering processing, filtering processing is performed using a 3×3 filter as shown in FIG. 10. Specifically, letting density data representing respective pixels in a 3×3 matrix centered around a target pixel be A to I, as shown in FIG. 11, density data representing the target pixel is converted into density data e indicated by the following equation (1):

$$e=(-B+H) \qquad (1)$$

Figure 8:
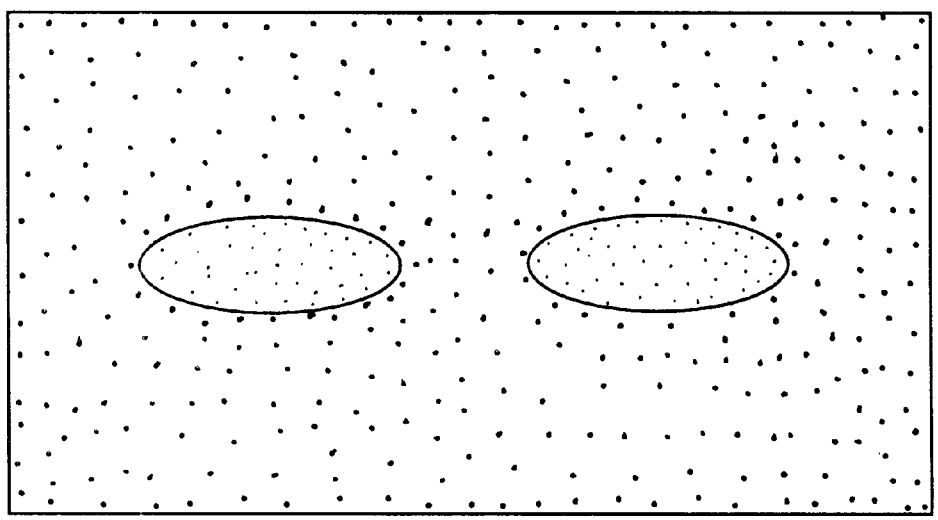
FIG. 8 is a typical diagram showing an image which has been subjected to filtering processing by filtering processing sections 61 and 62.

Such density conversion is made with respect to all the pixels, whereby an image as shown in FIG. 8 is obtained with respect to each of the projected points 30. Specifically, in FIG. 6, the portion 31 on which light is incident at the projected point 30, the portion 33 on the opposite side of the portion 31 on which light is incident, and the background portion take values close to black (values close to "0"), and the intermediate portion 32 at the projected point 30 takes a density value less than the values.

The image data which has been subjected to the first filtering processing is subjected to binary-coding processing by the binary-coding processing section 63 (step 2). The binary-coding processing is processing for extracting the intermediate portion 32 at the projected point 30 with respect to the portion 31 on which light is incident at the projected point 30, the portion 33 on the opposite side of the portion 31 on which light is incident and the background portion. Assuming that the image data which has been subjected to the first filtering processing is represented at 256 gray levels (black: 0, white: 255), "32", for example, is used as a threshold value.

Figure 9:
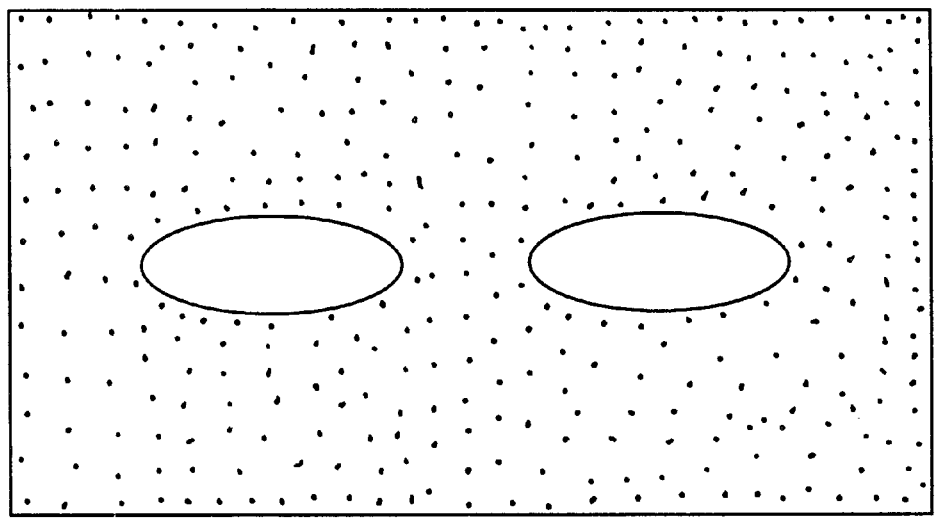
FIG. 9 is a typical diagram showing a binary-coded image obtained by a binary-coding processing section 63.

Specifically, pixel data whose density value is more than "32" and pixel data whose density value is not more than "32" in the image data after the filtering processing are respectively converted into white data whose value is "1" and black data whose value is "0". As a result, an image as shown in FIG. 9 (a binary-coded image corresponding to a pattern of projected points) is obtained. That is, white data corresponds to the projected points 30 formed on the document in braille 10.

Figure 14:
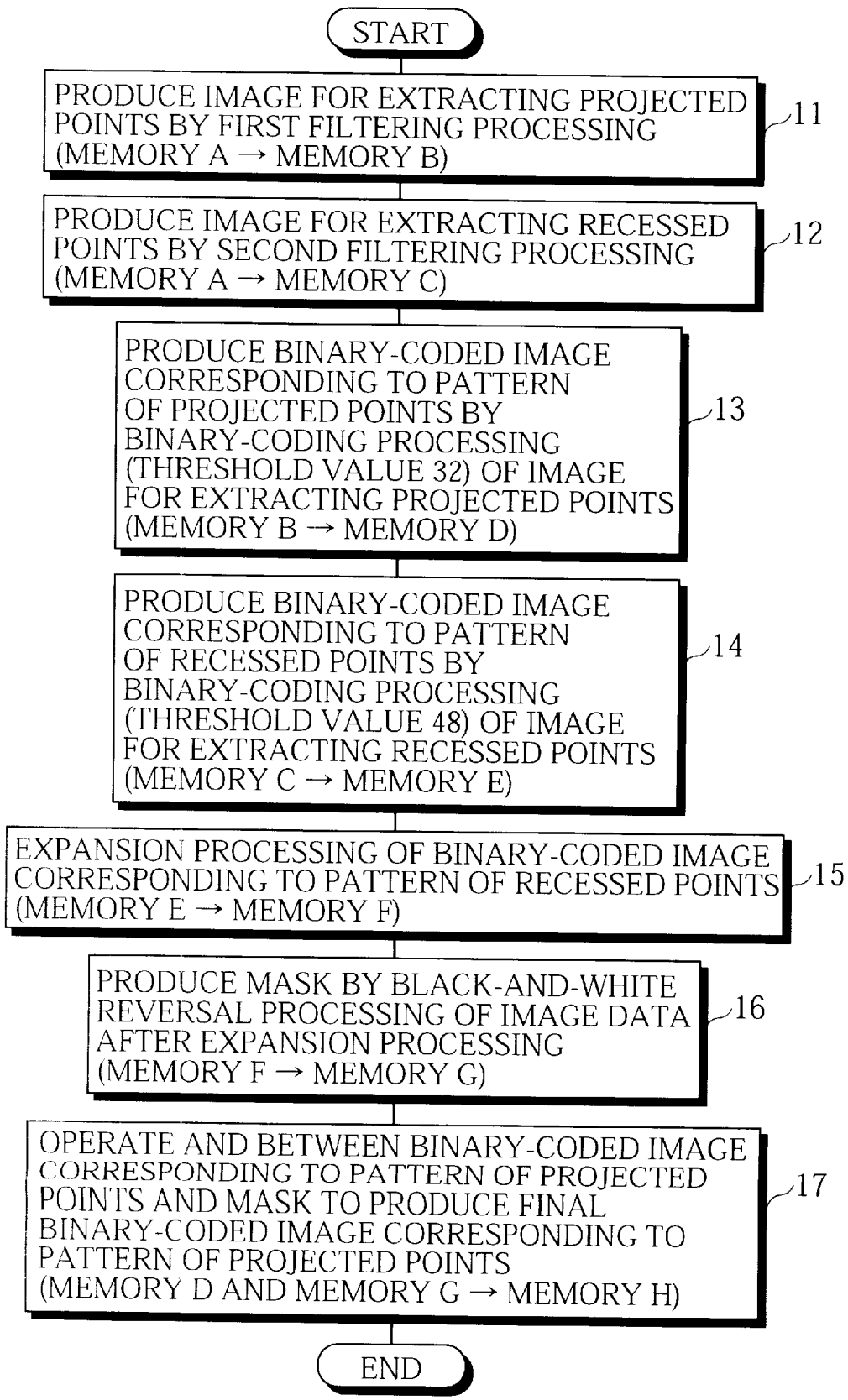
FIG. 14 is a flow chart showing the procedure for second binary-coded braille image production processing.

FIG. 14 illustrates the procedure for the second binary-coded braille image production processing.

The image data whose nonuniformity in luminance is removed which is stored in the memory A is first subjected to first filtering processing (filtering processing for extracting projected points) by the first filtering processing section 61 (step 11). The first filtering processing is the same as the processing in the step shown in FIG. 13 and hence, the description thereof is not repeated. An image for extracting projected points thus obtained is stored in an image memory 42 (hereinafter referred to as a memory B).

The image data stored in the memory A is then subjected to second filtering processing (filtering processing for extracting recessed points) by the second filtering processing section 62 (step 12). In the second filtering processing, filtering processing is performed using a 3×3 filter as shown in FIG. 12. Specifically, letting density data representing respective pixels in a 3×3 matrix centered around a target pixel be A to I, as shown in FIG. 11, density data representing the target pixel is converted into density data e indicated by the following equation (2):

$$e=(B-H) \qquad (2)$$

Such density conversion is made with respect to all the pixels, whereby the same image as that shown in FIG. 8 is obtained with respect to each of the recessed points 70. Specifically, in FIG. 7, the portion 71 on which light is incident at the recessed point 70, the portion 73 on the opposite side of the portion 71 on which light is incident, and the background portion take values close to black (values close to "0"), and the intermediate portion 72 at the recessed point 70 takes a density value less than the values. An image for extracting recessed points thus obtained is stored in an image memory 42 (hereinafter referred to as a memory C).

The image for extracting projected points which is stored in the memory B is subjected to binary-coding processing by the binary-coding processing section 63 (step 13). The binary-coding processing is processing for extracting the intermediate portion 32 at the projected point 30 with respect to the portion 31 on which light is incident at the projected point 30, the portion 33 on the opposite side of the portion 31 on which light is incident and the background portion. A threshold value is relatively loosely set in order to reliably extract intermediate portions 32 at all the projected points 30. Assuming that the image for extracting projected points is represented at 256 gray levels (black: 0, white: 255), the threshold value is "32".

Figure 15A:
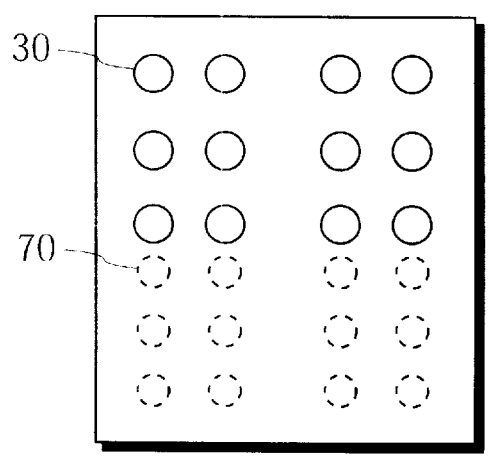
FIGS. 15a to 15f are typical diagrams for explaining second binary-coded braille image production processing.
Figure 15D:
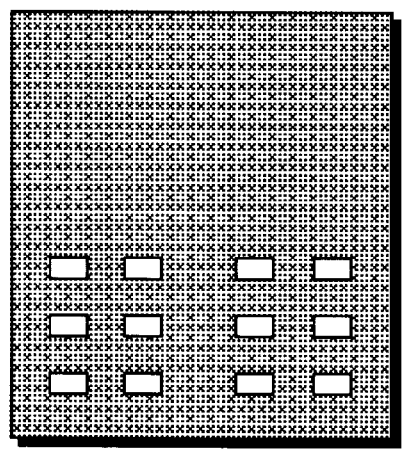
Figure 15B:
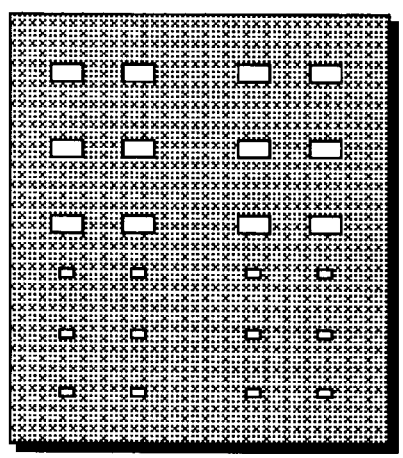

Specifically, pixel data whose density value is more than "32" and pixel data whose density value is not more than "32" in the image for extracting projected points after the first filtering processing are respectively converted into white data whose value is "1" and black data whose value is "0". As a result, assuming that a pattern of projected points 30 and a pattern of recessed points 70 appearing on the surface of the document in both-sided braille are as shown in FIG. 15a, an image corresponding to the pattern of projected points 30 which is represented by white data is obtained, as shown in FIG. 15b. Since the threshold value is relatively loosely set, however, the recessed points 70 may also remain as white data, as shown in FIG. 15b. A binary-coded image corresponding to the pattern of projected points thus obtained is stored in an image memory 42 (a memory D).

The image for extracting recessed points which is stored in the memory C is then subjected to binary-coding processing by the binary-coding processing section 63 (step 14). The binary-coding processing is processing for extracting the intermediate portion 72 at the recessed point 70 with respect to the portion 71 on which light is incident at the recessed point 70, the portion 73 on the opposite side of the portion 71 on which light is incident and the background portion. A threshold value is relatively strictly set in order not to extract the projected points 30 on the surface. A threshold value is "48" herein.

Specifically, pixel data whose density value is more than "48" and pixel data whose density value is not more than "48" in the image for extracting recessed points after the second filtering processing are respectively converted into white data whose value is "1" and black data whose value is "0". Since the threshold value is relatively strictly set, only an image corresponding to the pattern of recessed points 70 which is represented by white data is obtained, as shown in FIG. 15c. In this case, the threshold value is relatively strictly set, whereby the area of a white data portion corresponding to each of the recessed points 70 is decreased. A binary-coded image corresponding to the pattern of recessed points thus obtained is stored in an image memory 42 (a memory E).

The binary-coded image corresponding to the pattern of recessed points which is stored in the memory E is subjected to expansion processing by the expansion processing section 64 (step 15). The expansion processing by the expansion processing section 64 is processing taking the value of a target pixel as "1" if even one pixel out of eight pixels in the vicinity of the target pixel is represented by white data whose value is "1". Consequently, each of white data portions corresponding to the recessed points 70 shown in FIG. 15*c* is expanded, as shown in FIG. 15*d*. Image data thus obtained is stored in an image memory 42 (a memory F).

Figure 15E:
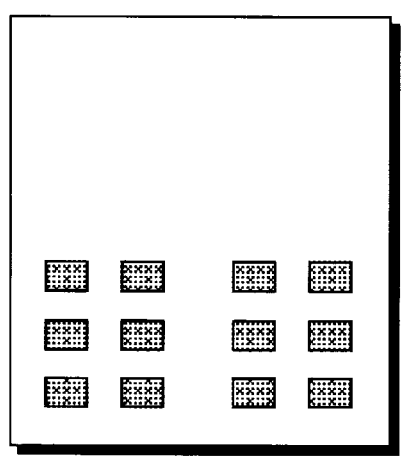
Figure 15C:
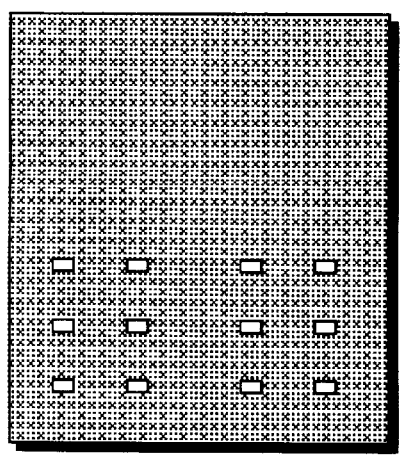

The image data stored in the memory F is then subjected to black-and-white reversal processing, whereby a mask as shown in FIG. 15*e* is produced (step 16). The produced mask is stored in an image memory 42 (a memory G).

Figure 15F:
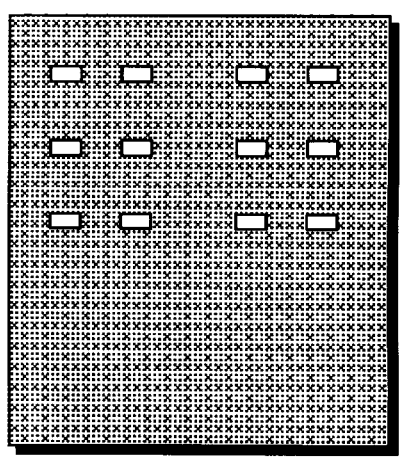

The logical product (AND) between the binary-coded image corresponding to the pattern of projected points (the image shown in FIG. 15*b*) stored in the memory D and the mask stored in the memory G is calculated (step 17). Consequently, the white data portions corresponding to the recessed points 70 remaining on the image shown in FIG. 15*b* are removed, to obtain an image corresponding to only the pattern of projected points (a final binary-coded image corresponding to the pattern of projected points) is obtained, as shown in FIG. 15*f*. The obtained final binary-coded image corresponding to the pattern of projected points is thus stored in an image memory (a memory H).

Figure 16:
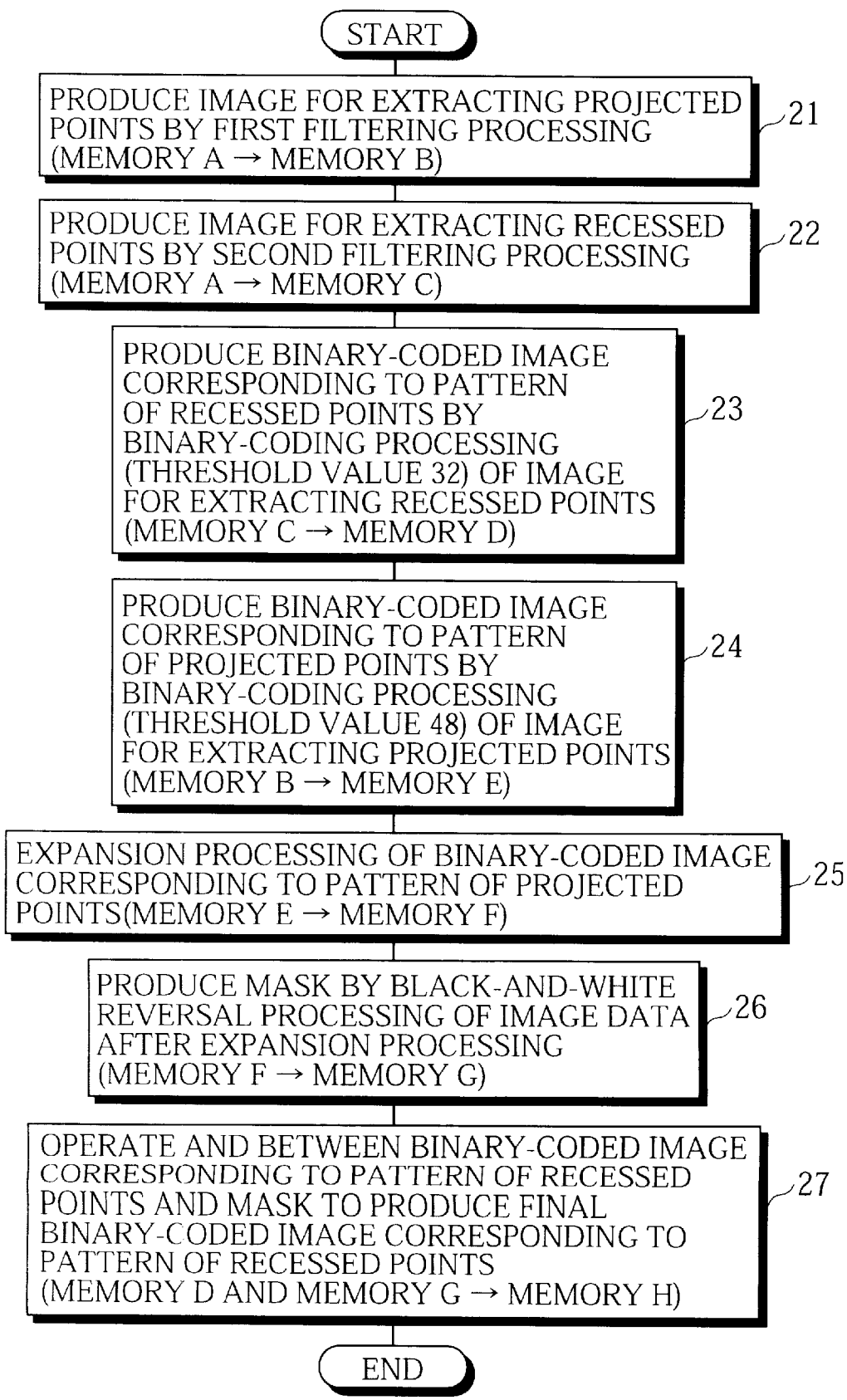
FIG. 16 is a flow chart showing the procedure for third binary-coded braille image production processing.

FIG. 16 shows the procedure for the third binary-coded braille image production processing.

Processing in the steps 21 and 22 is the same as the processing in the steps 11 and 12 shown in FIG. 14. In the step 23, the image for extracting recessed points after the second filtering processing is binary-coded using a threshold value "32" relatively loosely set. In the step 24, the image for extracting projected points after the first filtering processing is binary-coded using a threshold value "48" relatively strictly set.

In the step 25, the binary-coded image corresponding to the pattern of projected points obtained in the step 24 is subjected to expansion processing. In the step 26, the binary-coded image after the expansion processing is subjected to black-and-white reversal processing, to produce a mask.

In the step 27, the logical product between the binary-coded image corresponding to the pattern of recessed points obtained in the step 23 and the mask obtained in the step 26 is calculated. Consequently, a final binary-coded image corresponding to the pattern of recessed points is obtained.

The binary-coded image produced by the binary-coded braille image production processing section 44 is sent to a cutting processing section 45. When the document in both-sided braille is selectively set as the type of the document in braille, a binary-coded image corresponding to braille on the surface (a binary-coded image corresponding to the pattern of projected points) is first sent, after which a binary-coded image corresponding to braille on the reverse surface (a binary-coded image corresponding to the pattern of recessed points) is sent. Since a braille pattern represented by the binary-coded image corresponding to the braille on the reverse surface and the actual braille pattern on the reverse surface of the document in braille are laterally inverted, the direction in which image data corresponding to each line is read out from the image memory 42 is reverse to the direction in which the binary-coded image on the surface is read out. Consequently, the image read out from the image memory 42 and sent to the cutting processing section 45 is treated as a binary-coded image representing the pattern of projected points constituting the braille on the reverse surface of the document in braille.

Figure 17:
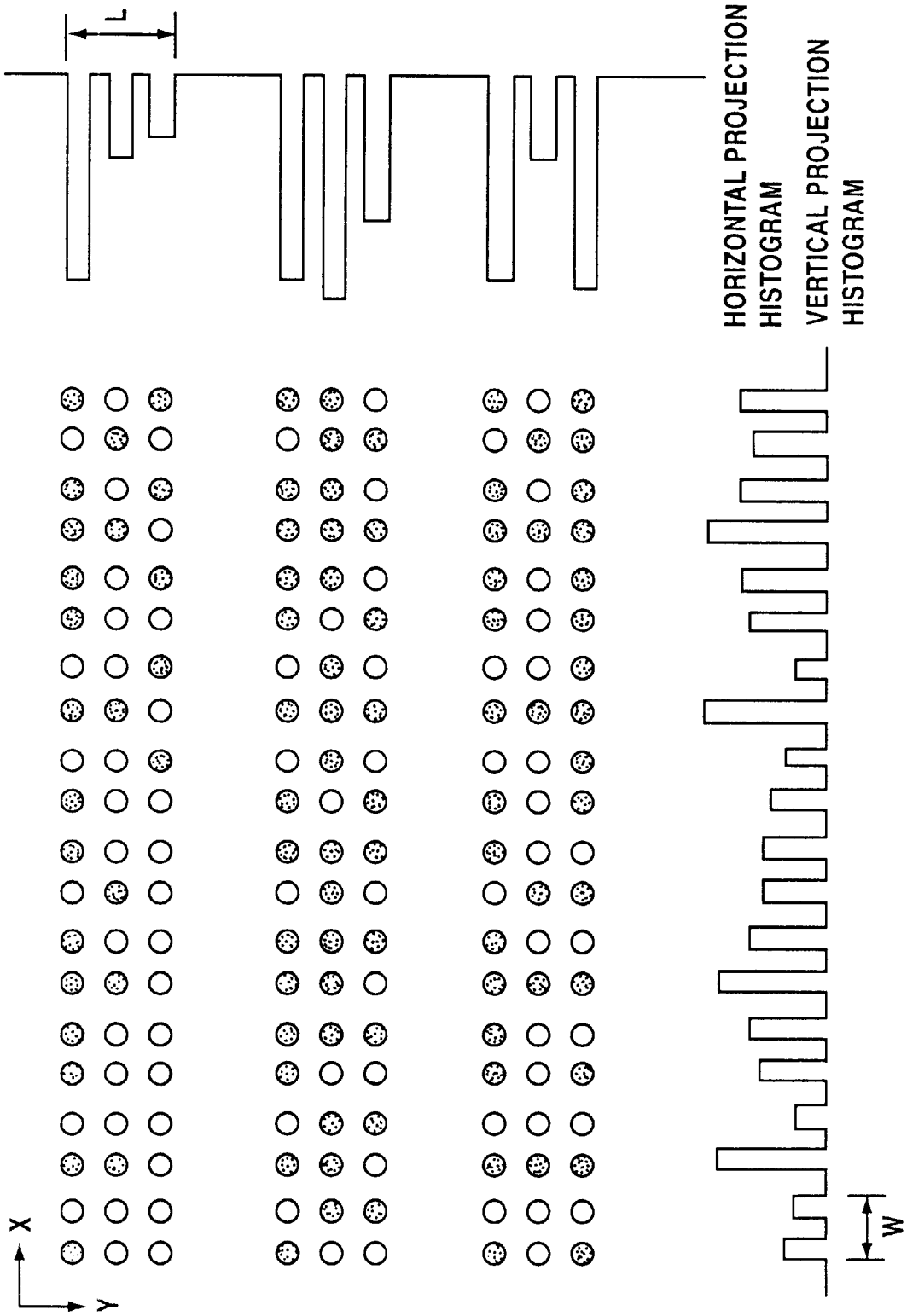
FIG. 17 is an illustration for explaining cutting processing by a cutting processing section 45.

In the cutting processing section 45, cutting processing for cutting each masu (braille unit) from the sent binary-coded image is performed. FIG. 17 illustrates a binary-coded image obtained by the binary-coded braille image production processing section 44. Each masu is constituted by six points comprising three columns of points and two rows of points, as shown in FIG. 17. In FIG. 17, a black circle represents a projected point.

In the cutting processing section 45, a horizontal projection operation and a vertical projection operation are exerted. In the horizontal projection operation, the value of a pixel is added in the horizontal direction (the X direction). Let the value of each of pixels constituting the binary-coded image be f (x, y). For each line in the horizontal direction, the total sum H (y) of the density values of the respective pixels included in the line is operated, as indicated by the following equation (3):

$$H(y) = \Sigma_x f(x,y) \tag{3}$$

In the vertical projection operation, the value of a pixel is added in the vertical direction (the Y direction). Let the value of each of pixels constituting the binary-coded image be f (x, y). For each line in the vertical direction, the total sum V (x) of the density values of the respective pixels included in the line is operated, as indicated by the following equation (4):

$$V(x) = \Sigma_y f(x,y) \tag{4}$$

A horizontal projection histogram is obtained, as shown in FIG. 17, on the basis of the results of the horizontal projection operation. On the other hand, a vertical projection histogram is obtained, as shown in FIG. 17, on the basis of the results of the vertical projection operation.

Figure 18:
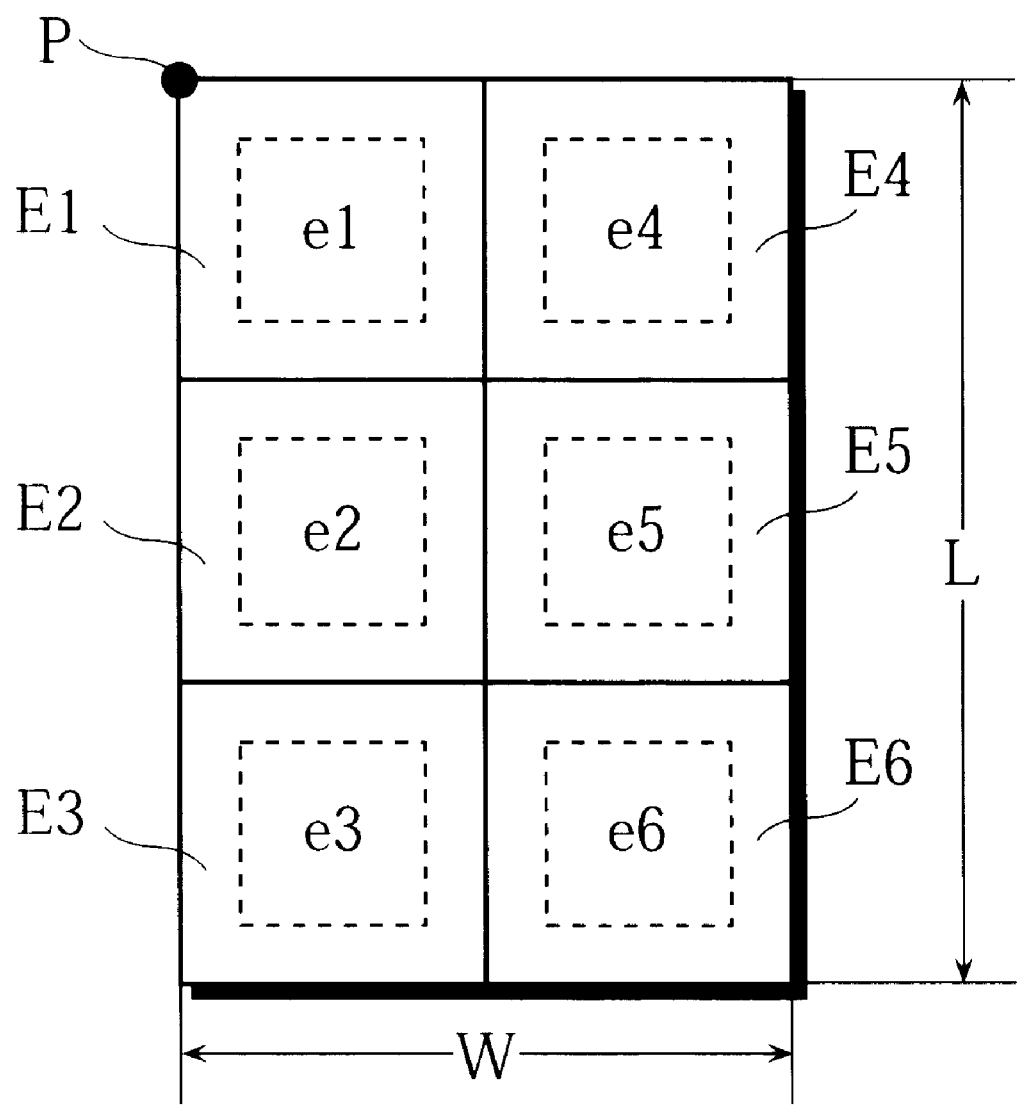
FIG. 18 is an illustration for explaining a braille/code conversion processing by a braille/code conversion processing section.

The vertical length L of the masu, the horizontal length of the masu W, and a reference position P representing the position of the masu are found, as shown in FIGS. 17 and 18, on the basis of the histograms. The information are stored in a position information storage memory 46. Masus are cut one at a time on the basis of the information stored in the position information storage memory 46.

The reference position P of each masu is found in the following manner. Specifically, the reference positions P of masu at the upper left corner, masu at the upper right corner, masu at the lower left corner, masu at the lower right corner are found on the basis of the histograms shown in FIG. 17. In addition, the pitch in the horizontal direction between masus (the horizontal length W of the masu+the spacing in the horizontal direction between the masus) and the pitch in the vertical direction between masus (the vertical length L of the masu+the spacing in the vertical direction between the masus) are found on the basis of the histograms shown in FIG. 17. The reference positions P of all the masus are calculated on the basis of the reference positions P of the masu at the upper left corner, the masu at the upper right corner, the masu at the lower left corner, and the masu at the lower right corner, the pitch in the horizontal direction between the masus (the horizontal length W of the masu+the spacing in the horizontal direction between the masus), and the pitch in the vertical direction between the masus.

An image picked up by the CCD camera 2 becomes a distorted image due to the characteristics of the optical system in the CCD camera 2. Specifically, if an original image in a lattice shape as shown in FIG. 19 is picked up by the CCD camera 2, a barrel-shaped image whose periphery expands in a bow shape as shown in FIG. 20 is obtained.

An error is included in the reference position P of each masu calculated in the above-mentioned method due to the characteristics of the optical system in the CCD camera 2. Therefore, it is preferable that the reference position P of each masu calculated in the above-mentioned method is corrected in the following manner.

Figure 19:
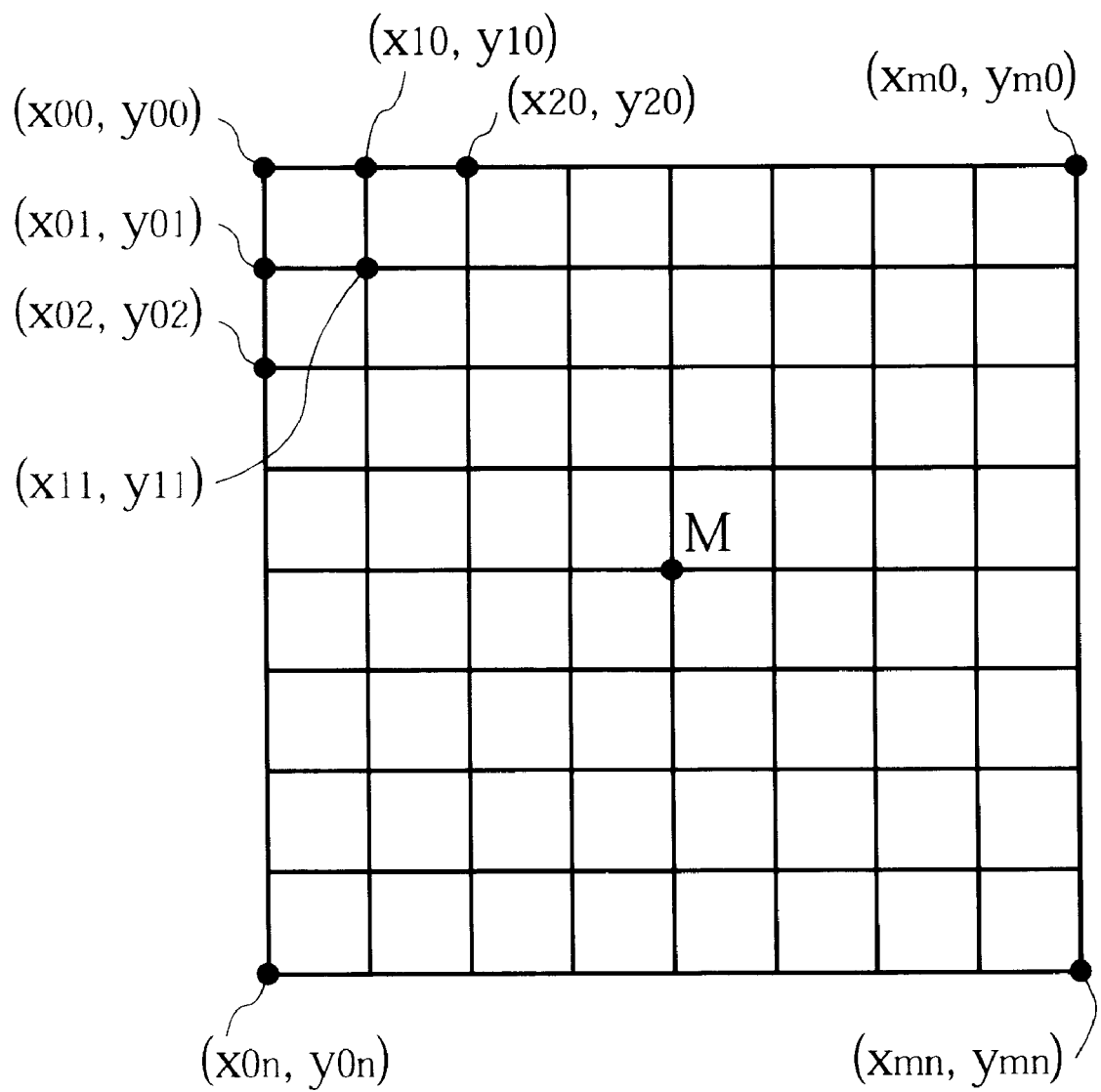
FIG. 19 is a typical diagram showing a lattice-shaped original image used for correcting distortion caused by the characteristics of an optical system in a CCD camera.
Figure 20:
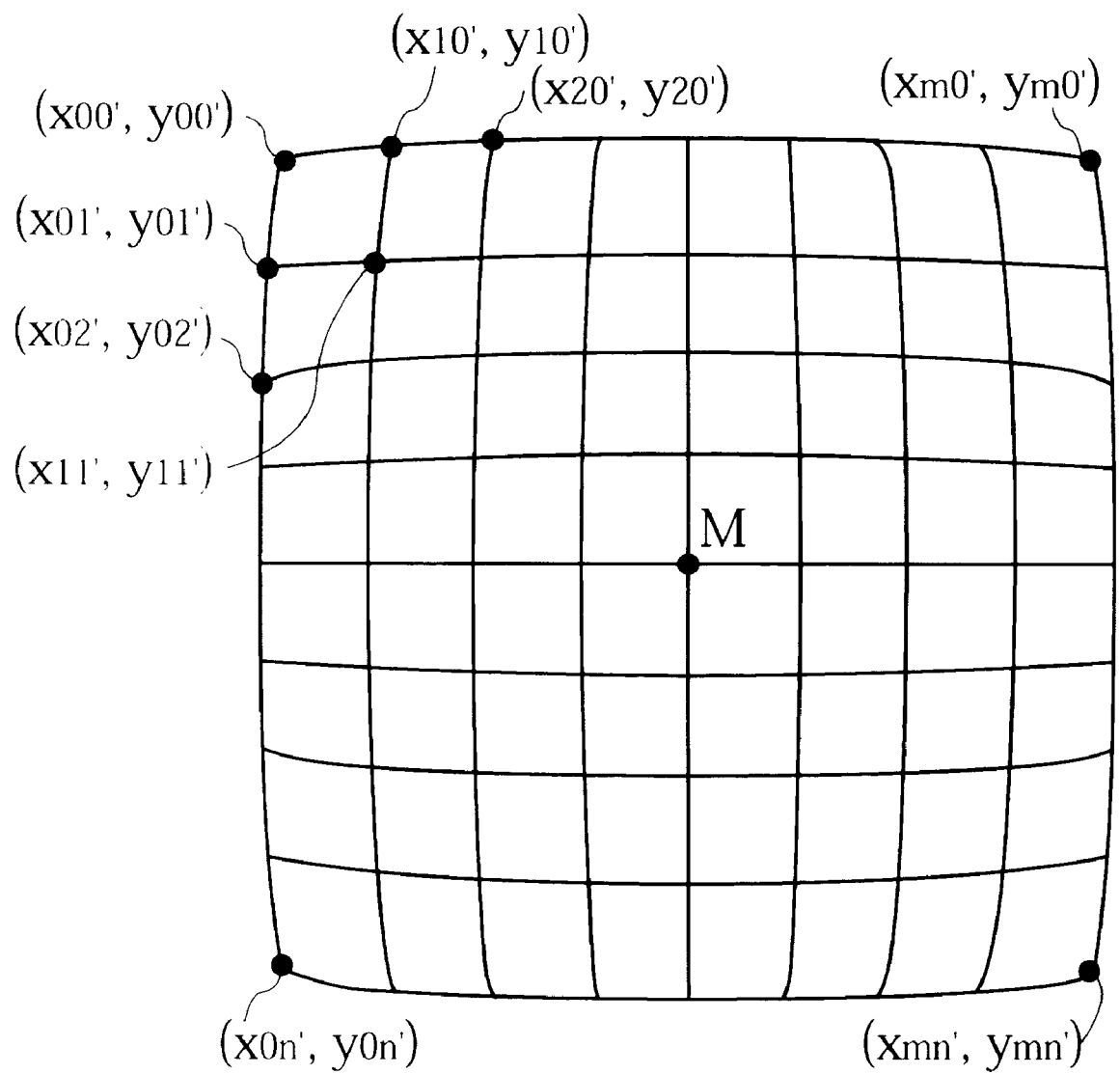
FIG. 20 is a typical diagram showing a picked-up image corresponding to the lattice-shaped original image shown in FIG. 19.

Specifically, the original image in a lattice shape as shown in FIG. 19 is previously picked up by the CCD camera 2, to obtain a distorted picked-up image as shown in FIG. 20. The relationship between coordinates $(x_{00}, y_{00})$, $(x_{10}, y_{10})$, . . . $(x_{mn}, y_{mn})$ of respective lattice points of the original image and coordinates $(x'_{00}, y'_{00})$, $(x'_{10}, y'_{10})$, . . . $(x'_{mn}, y'_{mn})$ of lattice points of the picked-up image corresponding thereto is produced as a coordinate conversion table, as shown in FIG. 21. Actually, a coordinate point of the original image which corresponds to the position of a pixel other than the lattice point of the picked-up image is also calculated by the interpolation method, and is added to the coordinate conversion table.

When the reference position P of each masu is calculated on the basis of the histograms shown in FIG. 17, the calculated reference position P is regarded as the coordinates of the picked-up image in the coordinate conversion table, and a coordinate point of the original image which corresponds to the coordinates is found. The found coordinate point is thus employed as the reference position of each masu, to cut the masu.

The cut masu is subjected to braille/code conversion processing by a braille/code conversion processing section 47. FIG. 18 illustrates an image representing one cut masu. The image representing the cut masu is divided into six regions $E_1$ to $E_6$ (three columns of regions and two rows of regions) so as to correspond to six regions where a projected point can be formed. As indicated by broken lines in FIG. 18, smaller regions $e_1$ to $e_6$ are respectively set in the regions $E_1$ to $E_6$. In this example, the size of each of the regions $E_1$ to $E_6$ is approximately 6×6 pixels, and the size of each of the regions $e_1$ to $e_6$ is approximately 4×4 pixels.

For each of the regions $e_1$ to $e_6$, the value of data for identifying the presence or absence of a projected point (hereinafter referred to as identifying data) $A_i$ is determined on the basis of the number of pixels whose value is "1" (significant pixels) included in the region. i indicate regions $e_1$ to $e_6$, which take values of 1 to 6 corresponding to $e_1$ to $e_6$. For example, it is judged whether or not the number of pixels whose value is "1" is not less than a predetermined value, for example, three within each of the regions $e_1$ to $e_6$. If the number of pixels whose value is "1" is not less than three, it is judged that a projected point exist in the region, whereby the identifying data $A_i$ is set to "1". On the contrary, if the number of pixels whose value is "1" is not more than three, it is judged that no projected point exists in the region, whereby the identifying data $A_i$ is set to "0".

If the identifying data $A_1$ to $A_6$ corresponding to $e_1$ to $e_6$ are determined with respect to one masu, a braille code C is generated on the basis of the following equation (5):

$$C = \sum_{i=1}^{6} A_i \cdot M_i \qquad (5)$$

In the foregoing equation (5), $M_i$ are weighting factors $M_1$ to $M_6$ determined so as to respectively correspond to the regions $e_1$ to $e_6$. The respective weighting factors $M_1$ to $M_6$ are set as indicated by the following equation (6):

$M_1=1, M_2=2, M_3=4$ $M_5=8, M_5=16, M_6=32$ \qquad (6)

Consequently, a code from "0" to "63" is assigned to the cut masu. The assigned code is converted into NABCC (North American Braille Computer Code), after which the NABCC is stored in a code storage memory 48. Such processing is performed with respect to all masus.

Each of the codes stored in the code storage memory 48 is then subjected to code/India-ink character conversion processing by a code/India-ink character conversion processing section 49. In the code/India-ink character conversion processing, the code is converted into a character in India ink on the basis of a previously determined rule. The obtained character in India ink is stored in an India-ink character storage memory 50.

Furthermore, the obtained character in India ink is displayed on a monitor 52 through an output processing section 51. The character in India ink is printed by a printer 53, and is voice-outputted by a speech synthesizer 54, as required.

The above-mentioned braille recognition system comprises a personal computer comprising a monitor 52 and having an image processing board and the speech synthesizer 54 carried thereon, a braille reading section 1, and a peripheral equipment such as the printer 53.

Figure 22:
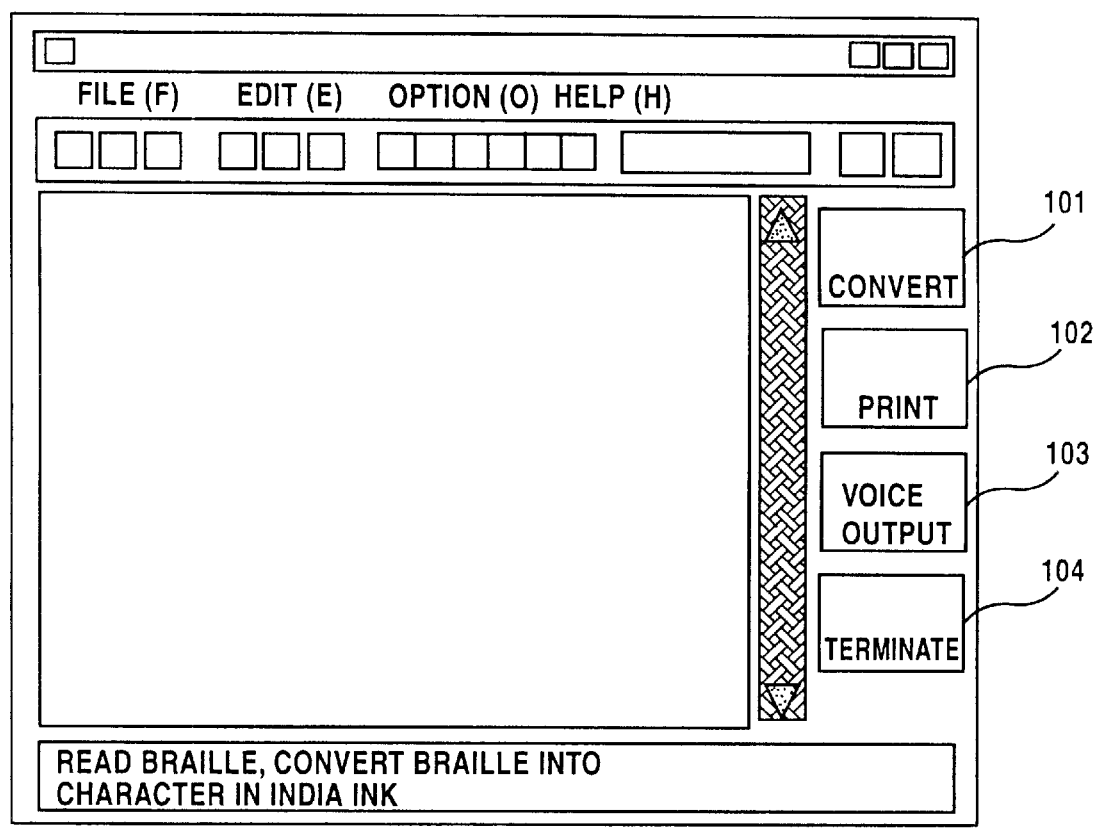
FIG. 22 is a typical diagram showing an operation screen displayed on a monitor 52.
Figure 23:
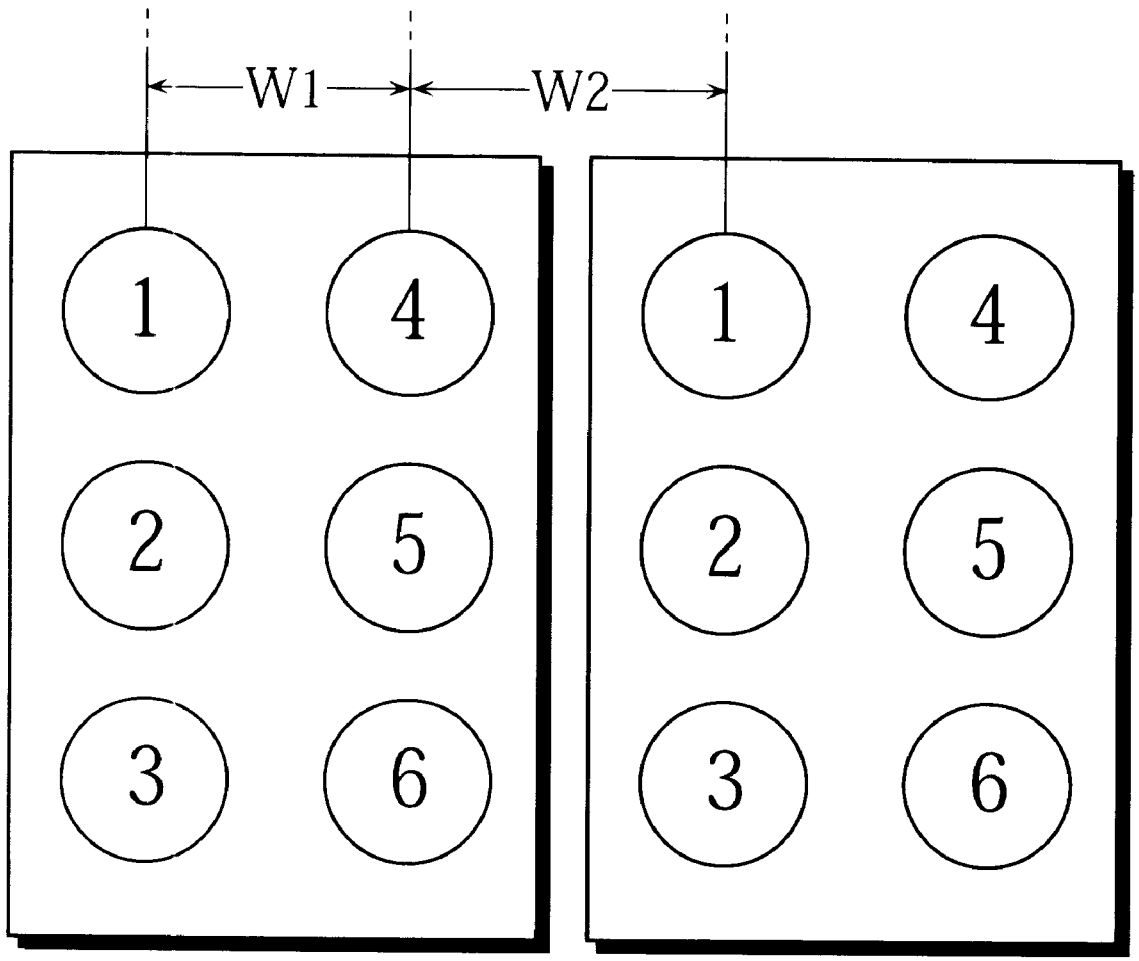
FIG. 23 is an illustration for explaining braille.

FIG. 22 illustrates an operation screen displayed on the monitor 52 of the personal computer. A button 101 is a button for reading braille and converting the braille into a character in India ink. A button 102 is a button for printing the obtained character in India ink by the printer 53. A button 103 is a button for voice-outputting the obtained character in India ink by the speech synthesizer 54. A button 104 is a button for terminating an application for braille recognition.

A pointer on the screen is moved to a region of a predetermined one of the buttons 101 to 104 by an input device such as a mouse (not shown), to click the mouse, whereby a command by the button is entered and executed.

In the present embodiment, when the pointer enters the region of the arbitrary one of the buttons 101 to 104, the color or the luminance of the button is changed. The contents of the button are displayed on the lower part of the screen, and are voice-outputted. For example, when the pointer enters the region of the button 101, the color of the button 101 is changed from blue to red, for example. A phrase "read braille, and convert braille into character in India ink" is displayed on the lower part of the screen, and is voice-outputted. Consequently, it is easy to perform the operation even by a weak-sighted person.

[2] Description of Braille Copying Apparatus

Figure 24:
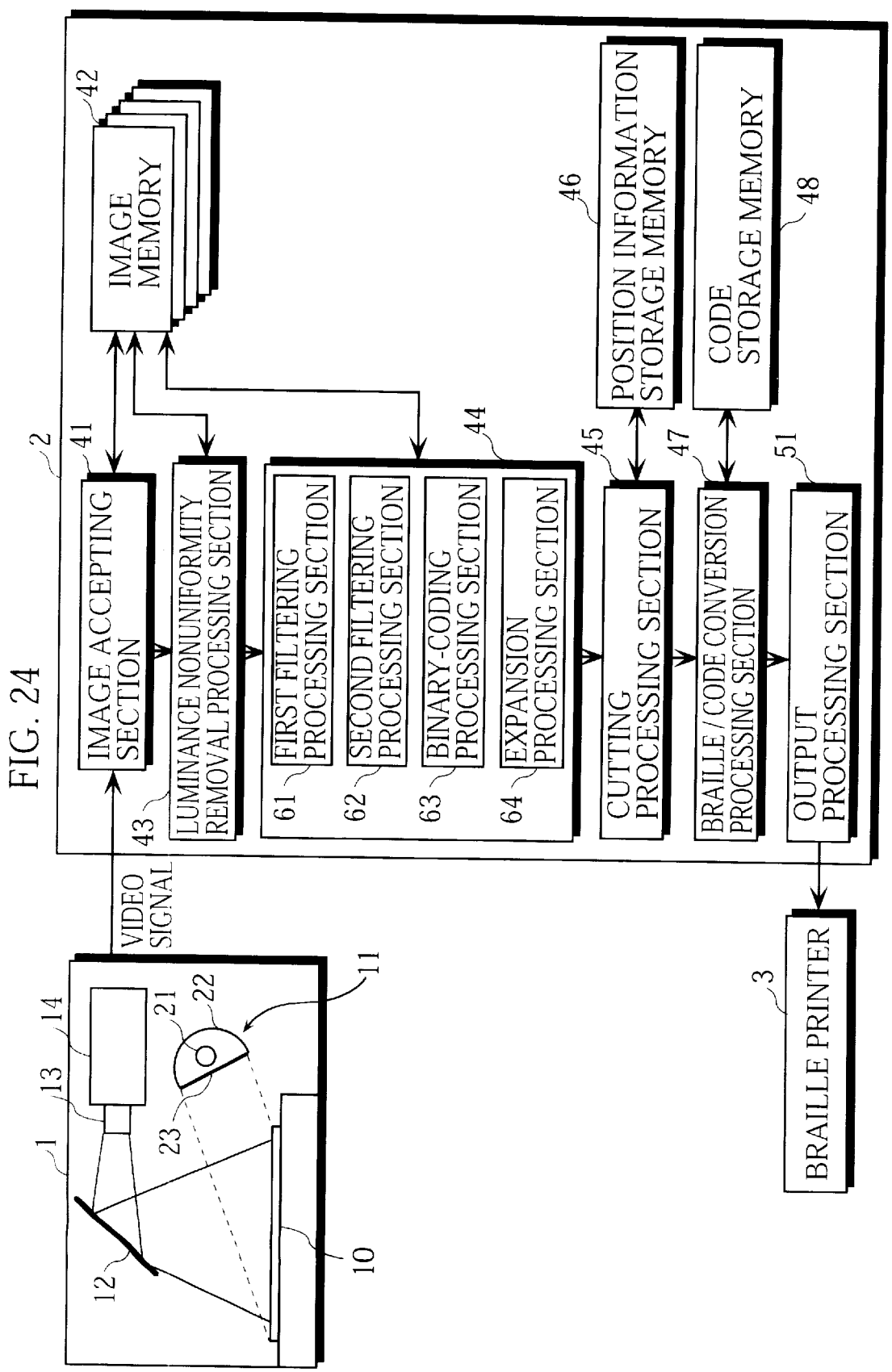
FIG. 24 is a block diagram showing the construction of a braille copying apparatus.

FIG. 24 illustrates the construction of a braille copying apparatus. In FIG. 24, the same sections as those shown in FIG. 1 are assigned the same reference numerals and hence, the description thereof is not repeated.

The difference between the braille copying apparatus shown in FIG. 24 and the braille recognition system shown in FIG. 1 is as follows.

(1) In the braille copying apparatus shown in FIG. 24, the code/India-ink character conversion processing section 49, the India-ink character storage memory 50, the monitor 52, the printer 53, and the speech synthesizer 54 shown in FIG. 1 are not provided.

(2) In the braille copying apparatus shown in FIG. 24, a braille printer 3 is provided in order to print braille corresponding to a braille code generated by a braille/code conversion processing section 47 on braille paper.

Also in the braille copying apparatus shown in FIG. 24, braille printed on a document in braille is recognized on the basis of a picked-up image on the document in braille, and a braille code corresponding to the braille printed on the document in braille is generated by the braille/code conversion processing section 47, as in the braille recognition system shown in FIG. 1. The braille code generated by the braille/code conversion processing section 47 is stored in a code storage memory 48.

The braille code stored in the code storage memory 48 is sent to the braille printer 3 through an output processing section 51. The braille printer 3 prints braille corresponding to the sent code on the braille paper, thereby to produce a duplicate of the read document in braille.

[3] Description of Other Embodiments

Figure 25:
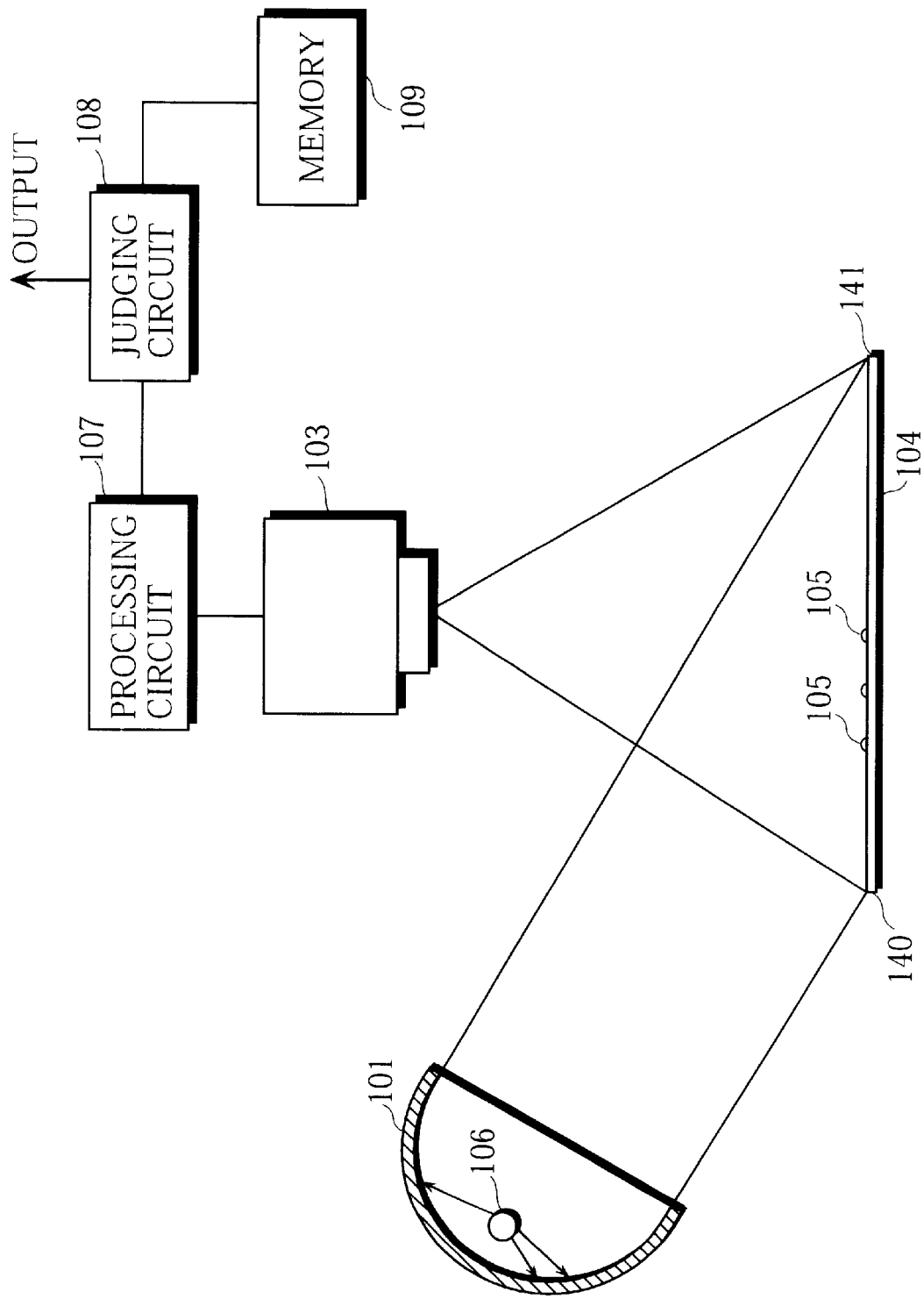
FIG. 25 is a block diagram showing an image recognition apparatus.
Figure 26:
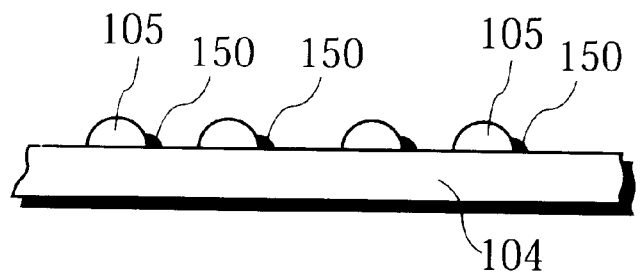
FIG. 26 is an enlarged side view showing braille.

FIG. 25 illustrates an image recognition apparatus for recognizing braille. In the apparatus, light is irradiated onto braille paper 104 on which braille constituted by a plurality of projected points 105 is printed by a lamp 101 arranged obliquely above the braille paper 104. A shadow 150 formed beside the projected point 105 (see FIG. 26) by the irradiated light is picked up by an imaging camera 103 arranged directly above the braille paper 104. The braille represents a character depending on the arrangement pattern of the projected points 105 on the braille paper 104. A pattern of shadows 150 differs depending on a corresponding character.

An image corresponding to the shadows 150 picked up by the imaging camera 103 is subjected to binary-coding processing in a processing circuit 107, and is sent to a judging circuit 108. Patterns of projected points 105 (patterns of shadows 150) corresponding to various types of characters are previously stored in a memory 109. The judging circuit 108 compares the image which has been subjected to the binary-coding processing with the data stored in the memory 109, to output character information corresponding to the pattern of shadows 150. That is, a character is read from the pattern of shadows 150.

In the apparatus shown in FIG. 25, the lamp 101 must be arranged obliquely above the braille paper 104 in order to read the image corresponding to the shadows 150 from directly above the braille paper 104. If the lamp 101 is thus arranged, the illuminance differs with respect to respective portions of the braille paper 104 Specifically, the illuminance is high in an end 140 nearer the lamp 101, while being low in an end 141 farther away from the lamp 101 due to the difference in the optical path lengths of light rays emitted from the lamp 101.

Figure 27:
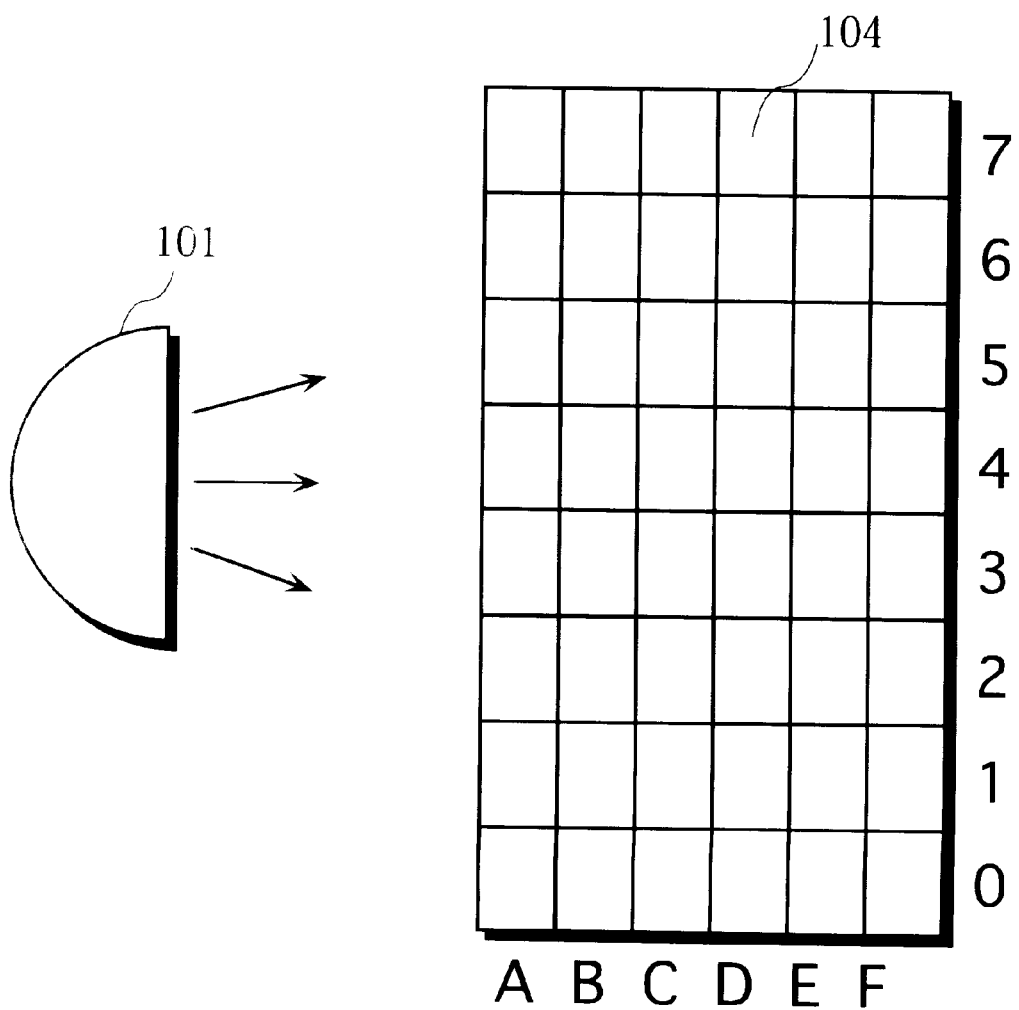
FIG. 27 is a plan view showing regions obtained by division on braille paper.
Figure 28:
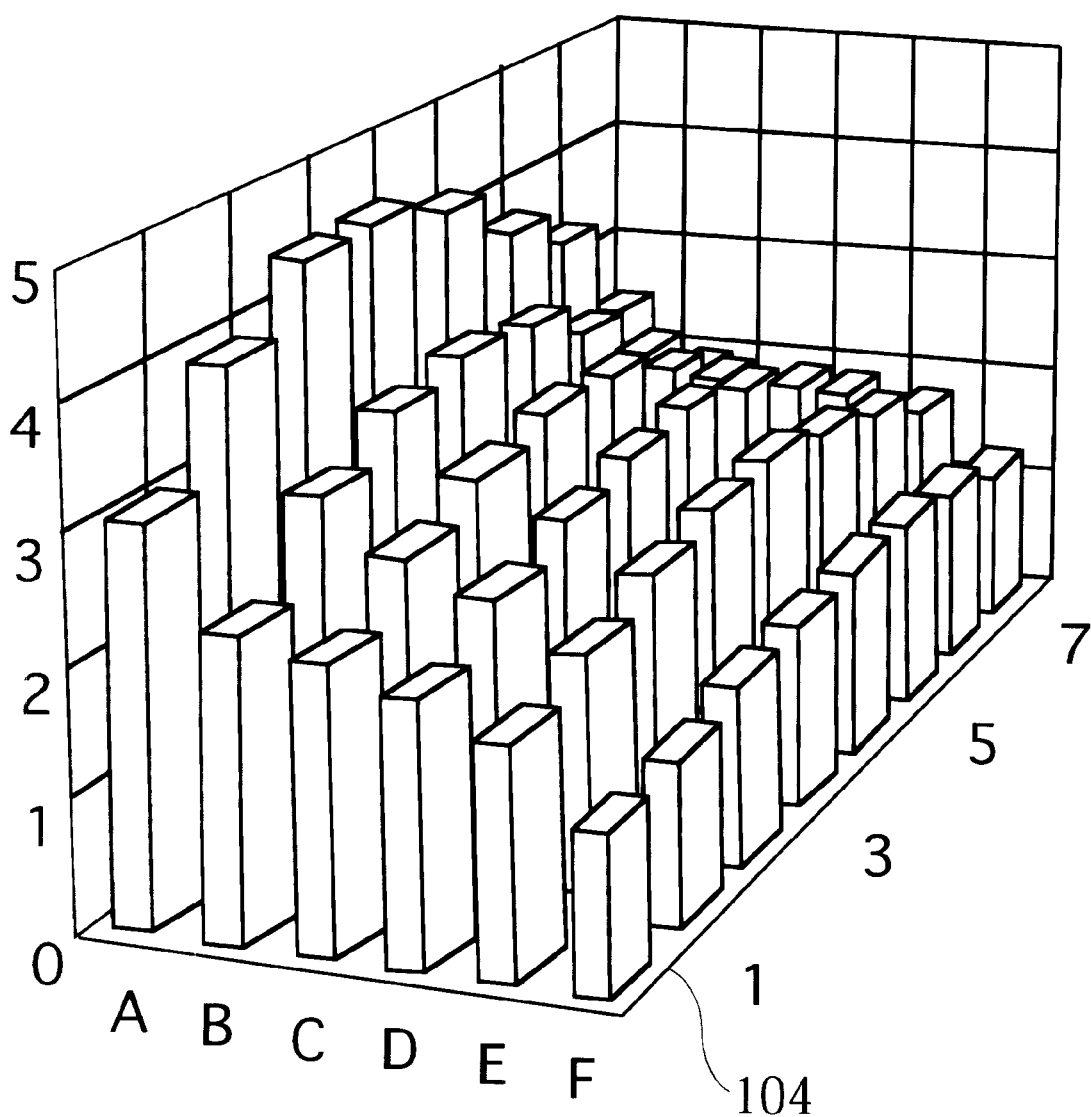
FIG. 28 is a graph showing the illuminance distribution on braille paper.

FIG. 27 is a diagram showing a braille paper 104 divided into six regions A to F in the transverse direction and eight regions 0 to 7 in the longitudinal direction. FIG. 28 is a bar graph showing a relative illuminance ratio for each region obtained by the division. The illuminance in the region A nearest the lamp 101 is approximately four times the illuminance in the region F farthest away from the lamp 101.

Consequently, the shadows formed beside the projected points 105 differ in light and shade in each of the regions of the braille paper 104, whereby it is difficult to extract all the shadows by the binary-coding processing.

Figure 29:
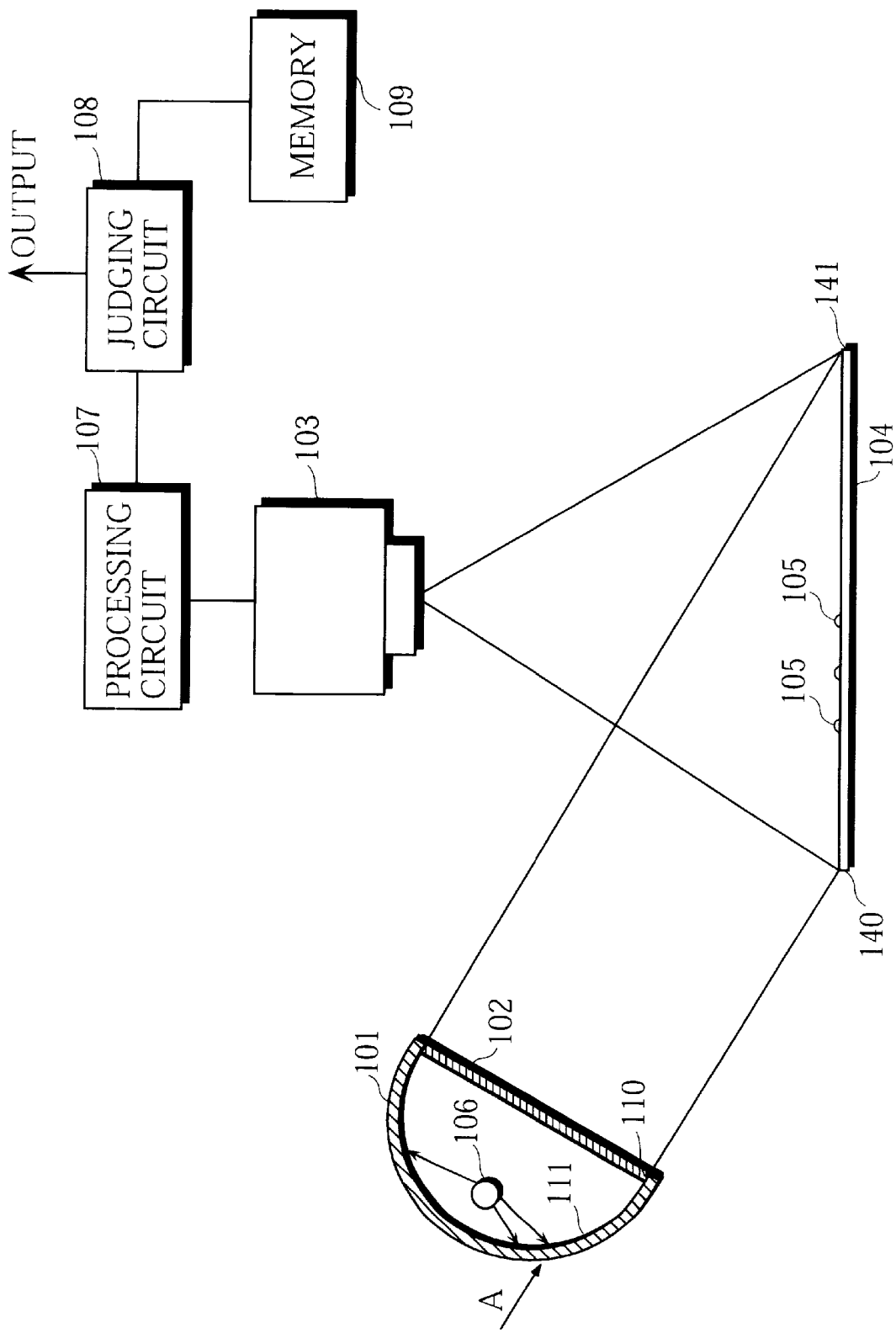
FIG. 29 is a block diagram showing the construction of an image recognition apparatus.
Figure 30:
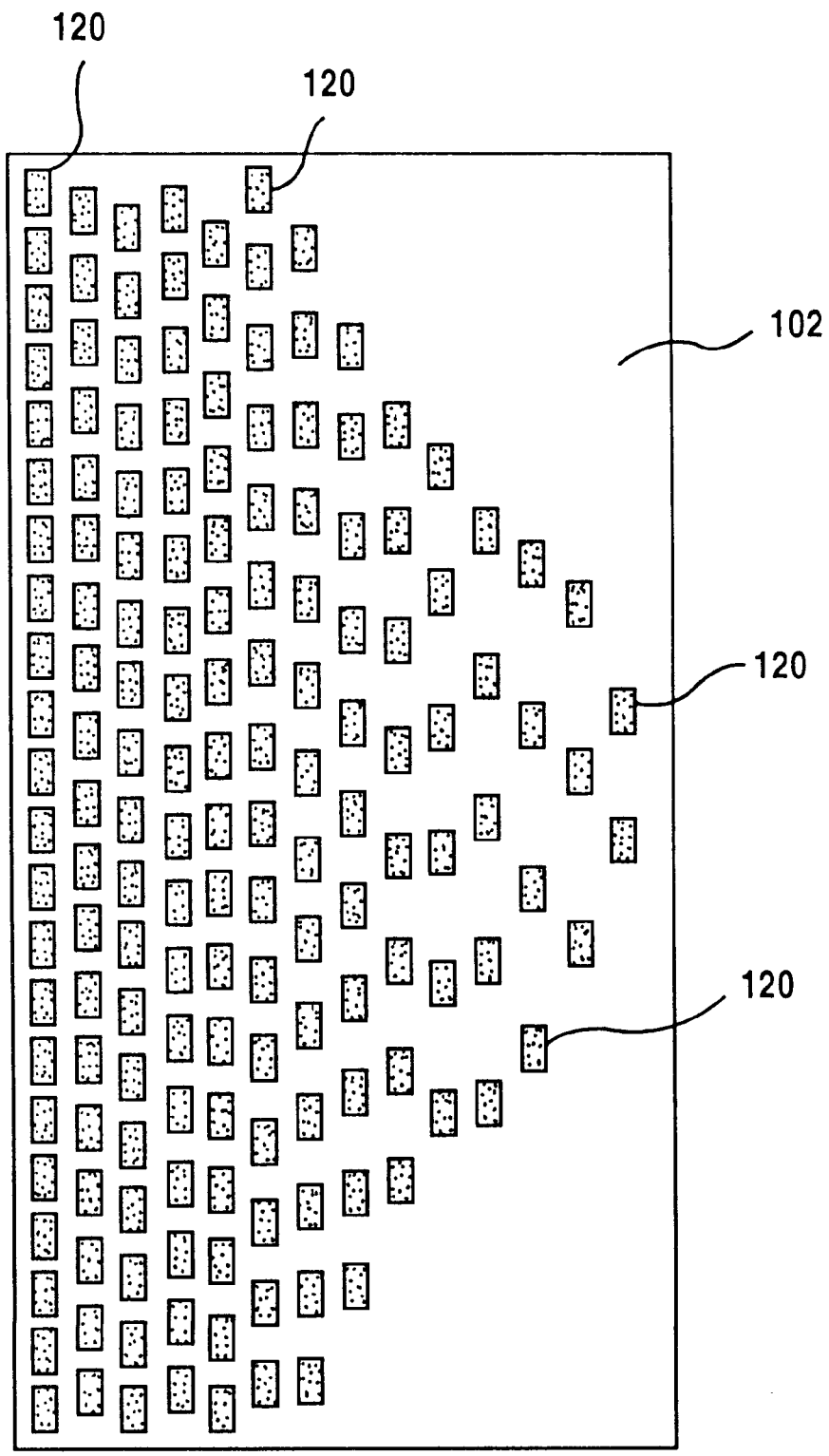
FIG. 30 is a diagram showing a filter as viewed in a direction A shown in FIG. 1.

FIG. 29 illustrates an image recognition apparatus capable of making the illuminance distributions in all regions of braille paper 104 approximately constant.

Also in the image recognition apparatus, an imaging camera 103 is arranged directly above the braille paper 104, and a lamp 101 is arranged obliquely above the braille paper 104. An image corresponding to shadows picked up by the imaging camera 103 is subjected to binary-coding processing by a processing circuit 107, and is sent to a judging circuit 108. Patterns of projected points (patterns of shadows) corresponding to various types of characters are previously stored in a memory 109. The judging circuit 108 compares the image which has been subjected to the binary-coding processing with the data stored in the memory 109, to output character information corresponding to the pattern of shadows.

The lamp 101 comprises a bowl-shaped reflecting mirror 111 having an opening 110, a filter 102 provided so as to close the opening 110 of the reflecting mirror 111, a light emitting member 106 arranged in a space formed by the reflecting mirror 111 and the filter 102. Light emitted from the light emitting member 106 is reflected from the reflecting mirror 111, and is outputted as parallel light rays traveling straight to the braille paper 104. The filter 102 is provided in order to make the illuminance distributions in all the regions of the braille paper 104 approximately constant.

The lamp 101 irradiates light onto the braille paper 104 obliquely from above the braille paper 104. Therefore, on the braille paper 104, the illuminance is high in a portion where the optical path length from the lamp 101 is small, while being low in a portion where the optical path length from the lamp 101 is large. When the difference in the illuminance distributions on the braille paper 104 is large, the shadows greatly differ in light and shade, whereby all the shadows cannot be extracted by the binary-coding processing.

The light transmittance of the filter 102 is varied depending on the illuminance distribution on the braille paper 104. Specifically, a number of shading dots 120 are formed on the filter 102, and the distribution density of the shading dots 120 is varied, to vary the light transmittance of the filter 102 for each portion.

In a portion through which light whose optical path length from the lamp 101 to the braille paper 104 is large passes (a portion corresponding to A in FIG. 27), a number of shading dots 120 are distributed, whereby the light transmittance is low. On the contrary, in a portion through which light whose optical path length from the lamp 101 to the braille paper 104 is small passes (a portion corresponding to F in FIG. 27), few shading dots 120 are distributed, whereby the light transmittance is high. Portions corresponding to F-0 and F-7 are the highest in transmittance.

Light rays reaching an end 140 of the braille paper 104 are easily intercepted by the shading dots 120, and light rays reaching an end 141 of the braille paper 104 are hardly intercepted by the shading dots 120.

Figure 31:
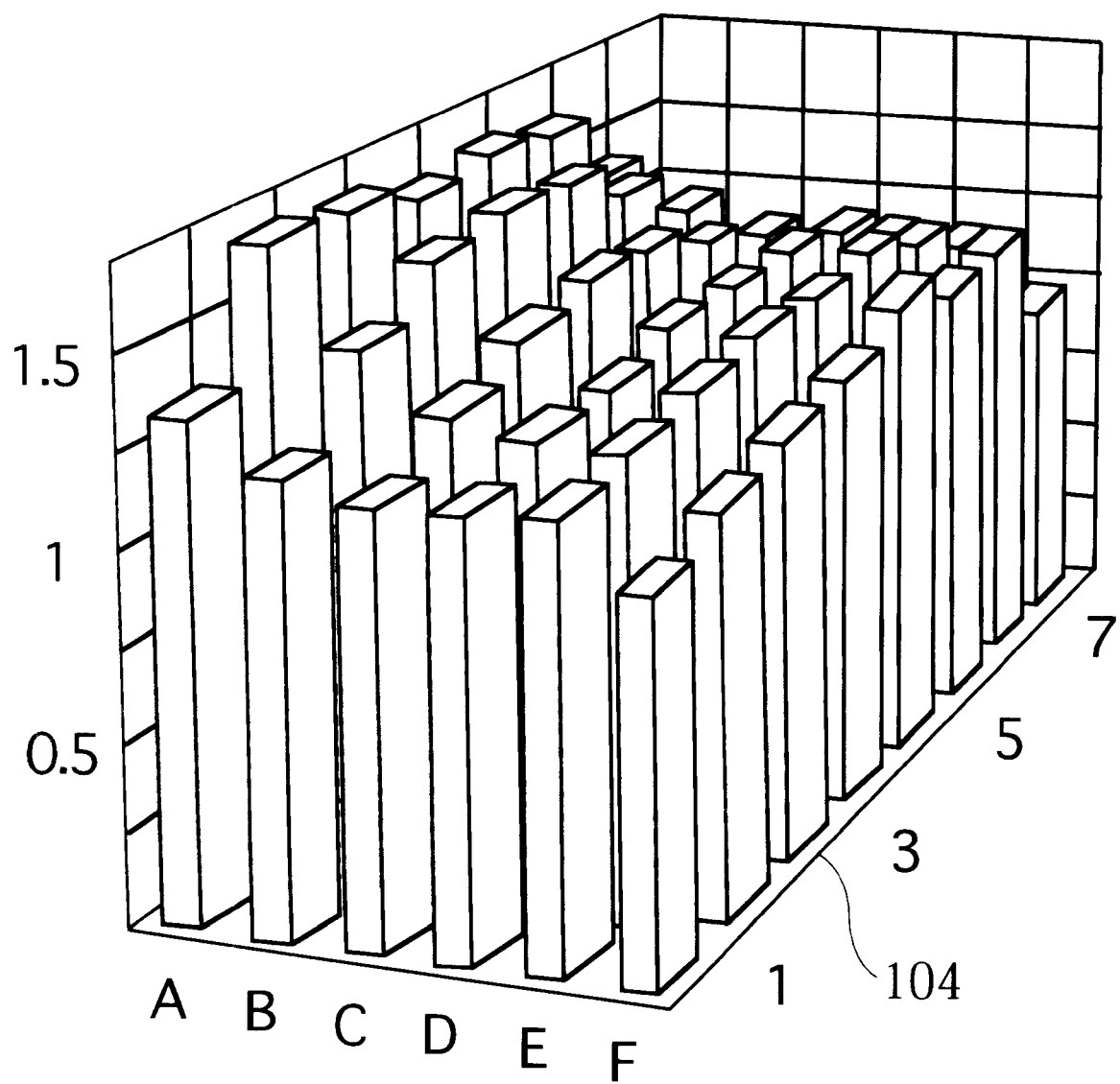
FIG. 31 is a graph showing the illuminance distribution on braille paper in a case where a filter is mounted.

FIG. 31 is a bar graph showing a relative illuminance ratio for each region obtained by division in a case where the filter 102 is mounted. The illuminance in the region A which is the highest is only approximately 1.4 times the illuminance in the region F which is the lowest, whereby the difference in the illuminance distributions on the braille paper 104 can be made smaller than that in the apparatus shown in FIG. 25.

Consequently, shadows formed beside projected points 105 hardly differ in light and shade, whereby all the shadows can be extracted by the binary-coding processing.

Although the light transmittance of each of the portions of the filter 102 is changed by the shading dots 120, the light transmittance of each of the portions of the filter 102 may be changed by changing the color of the portion of the filter 102.

Figure 32:
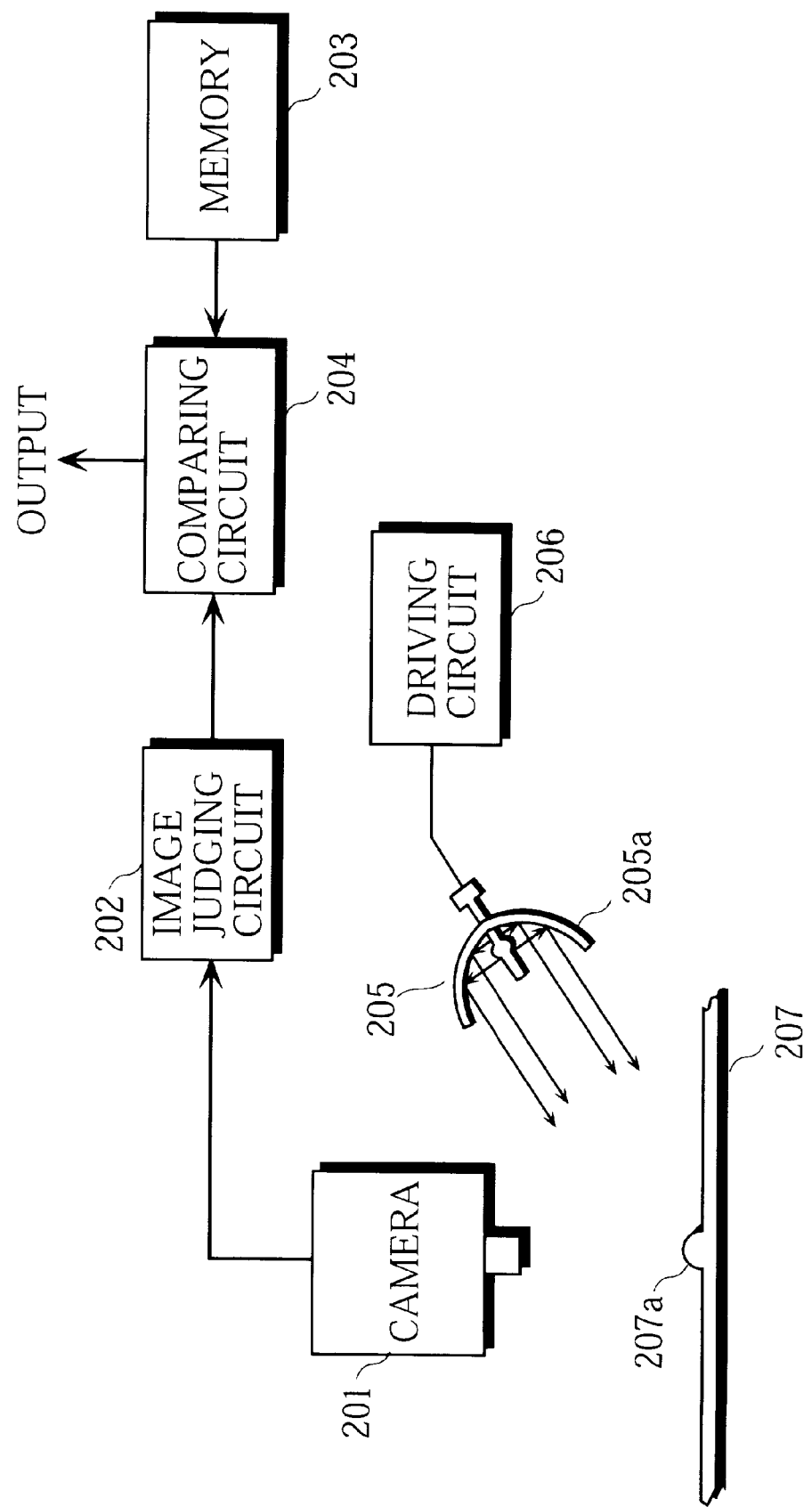
FIG. 32 is a block diagram showing the construction of an image recognition apparatus.

FIG. 32 illustrates another image recognition apparatus.

In FIG. 32, reference numeral 201 denotes a camera, reference numeral 202 denotes an image judging circuit for judging an image from the camera 201, reference numeral 203 denotes a memory storing braille patterns corresponding to various types of characters, reference numeral 204 denotes a comparing circuit for comparing a pattern obtained by the image judging circuit 202 with the braille pattern stored in the memory 203, reference numeral 205 denotes an illuminating lamp for emitting parallel light, reference numeral 206 denotes a driving circuit for driving the illuminating lamp 205, and reference numeral 207 denotes an original in braille.

Description is now made of the operations of the image recognition apparatus. The image recognition apparatus is an apparatus for judging braille from the original in braille 207 and converting the braille into character information. In order to identify the braille, projections 207a put on the original 207 must be judged.

Therefore, the original 207 is arranged below the camera 201, and light is irradiated onto the original 207 by the illuminating lamp 205. The illuminating lamp 205 is so arranged that a shadow is formed for each projection 207a.

Description is made of a method of forming a shadow for each projection 207a. It is important in the method of forming a shadow that the size of the shadow and its contrast are clear. The reason for this is that in order to recognize the position of each projection 207a, the shadow formed beside the projection 207a must be extracted on the basis of an image obtained from the camera 201.

Figure 34A:
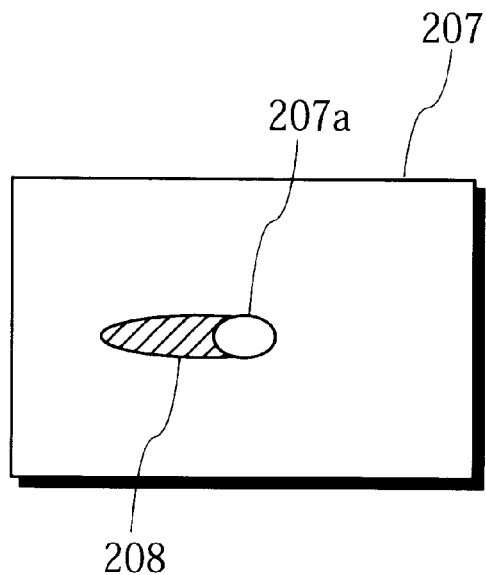
FIGS. 34a and 34b are typical diagrams for explaining the change in the state of a shadow depending on the arrangement of an illuminating lamp.

In order to obtain a shadow of suitable size, therefore, the arrangement of the illuminating lamp 205 must be devised. Examples of the arrangement of the illuminating lamp 205 include an arrangement as indicated by P1, P2, or P3 in FIG. 33. When the illuminating lamp 205 is positioned directly above the projection 207a as indicated by P1, a shadow is hardly formed. In the arrangement indicated by P3, a shadow 208 is long as shown in FIG. 34a. When the spacing between shadows 208a is short, therefore, the shadows are overlapped with each other.

Figure 34B:
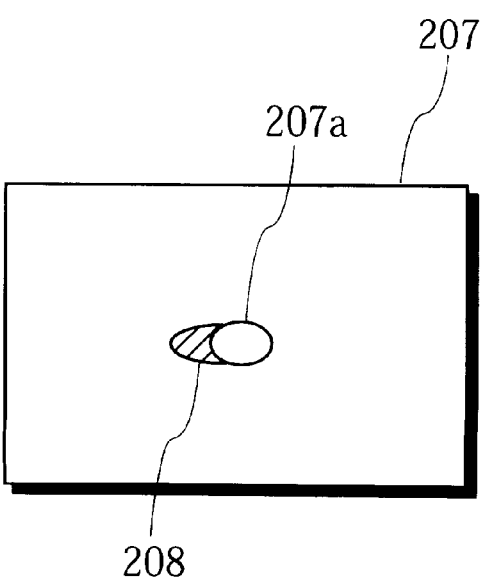

Therefore, the illuminating lamp 205 is so arranged that it can irradiate light onto the projection 207a obliquely at a suitable angle, as indicated by P2 in FIG. 33. When the illuminating lamp 205 is arranged in the position P2, a shadow 208 attains suitable size, as shown in FIG. 34b.

The next problem is the diffusion of light from the illuminating lamp 205. Since light is naturally diffused, the shadow is lightened due to the diffusion of light even if light rays are directed to the projection 207a. Therefore, directional light is convergently directed to the projection 207a by providing an optical reflector 205a which is a parabolic mirror in the illuminating lamp 205 to produce parallel light, as shown in FIG. 32, to increase the contrast of the shadow. Consequently, a shadow making a clear contrast is obtained.

The shadow beside the projection 207a obtained in the above-mentioned manner is picked up by the camera 201. An image obtained by picking up the shadows is inputted to the image judging circuit 202, to judge the arrangement of the projections constituting braille from the arrangement of the shadows. Data in the memory 203 storing arrangement patterns of projections corresponding to various types of characters and a judgment output of the image judging circuit 202 are compared with each other in the comparing circuit 204, to obtain character information on the basis of the comparison. The braille is thus replaced with a character.

Figure 35:
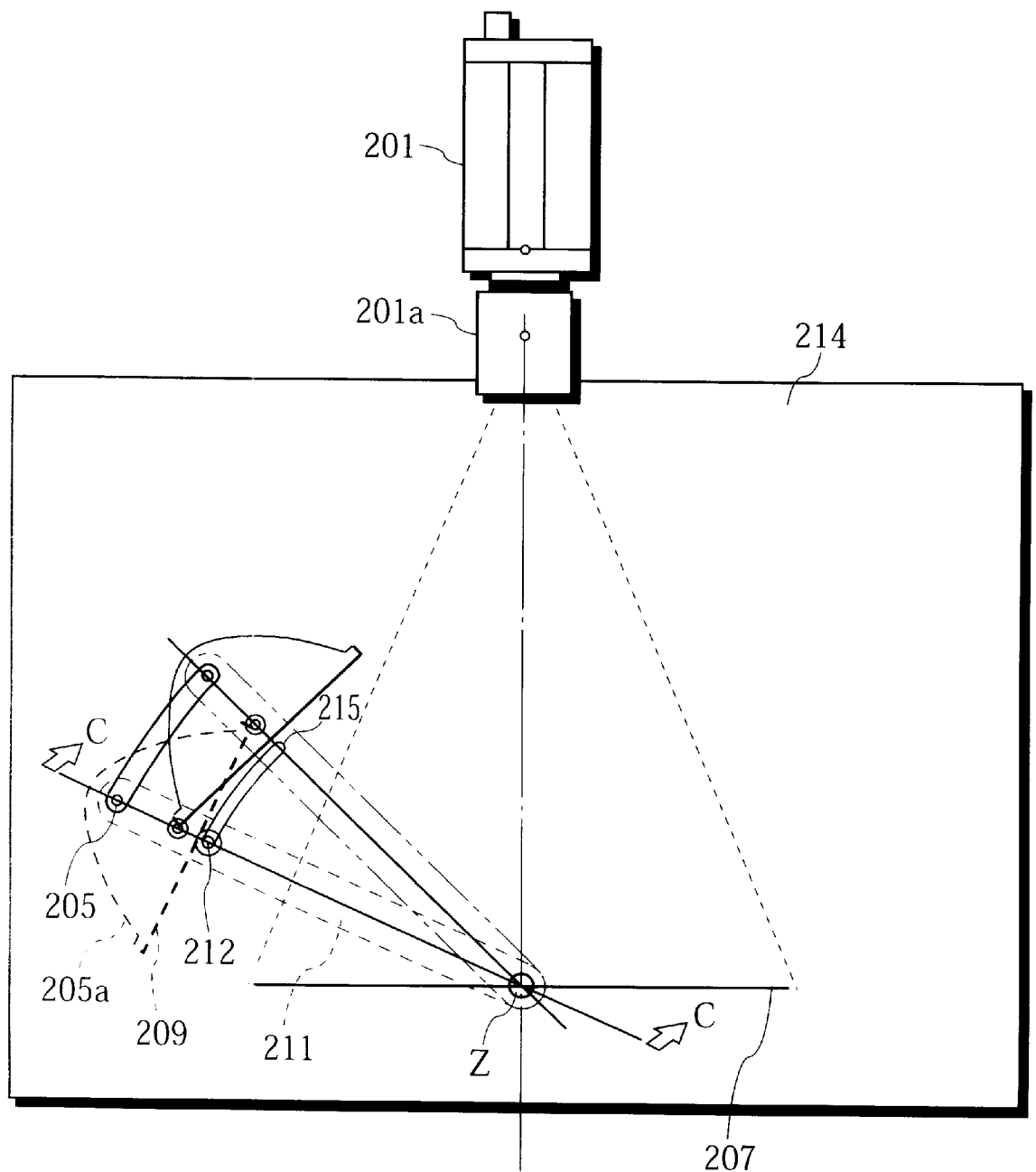
FIG. 35 is a side view showing a mechanism for changing the illuminating angle.
Figure 36:
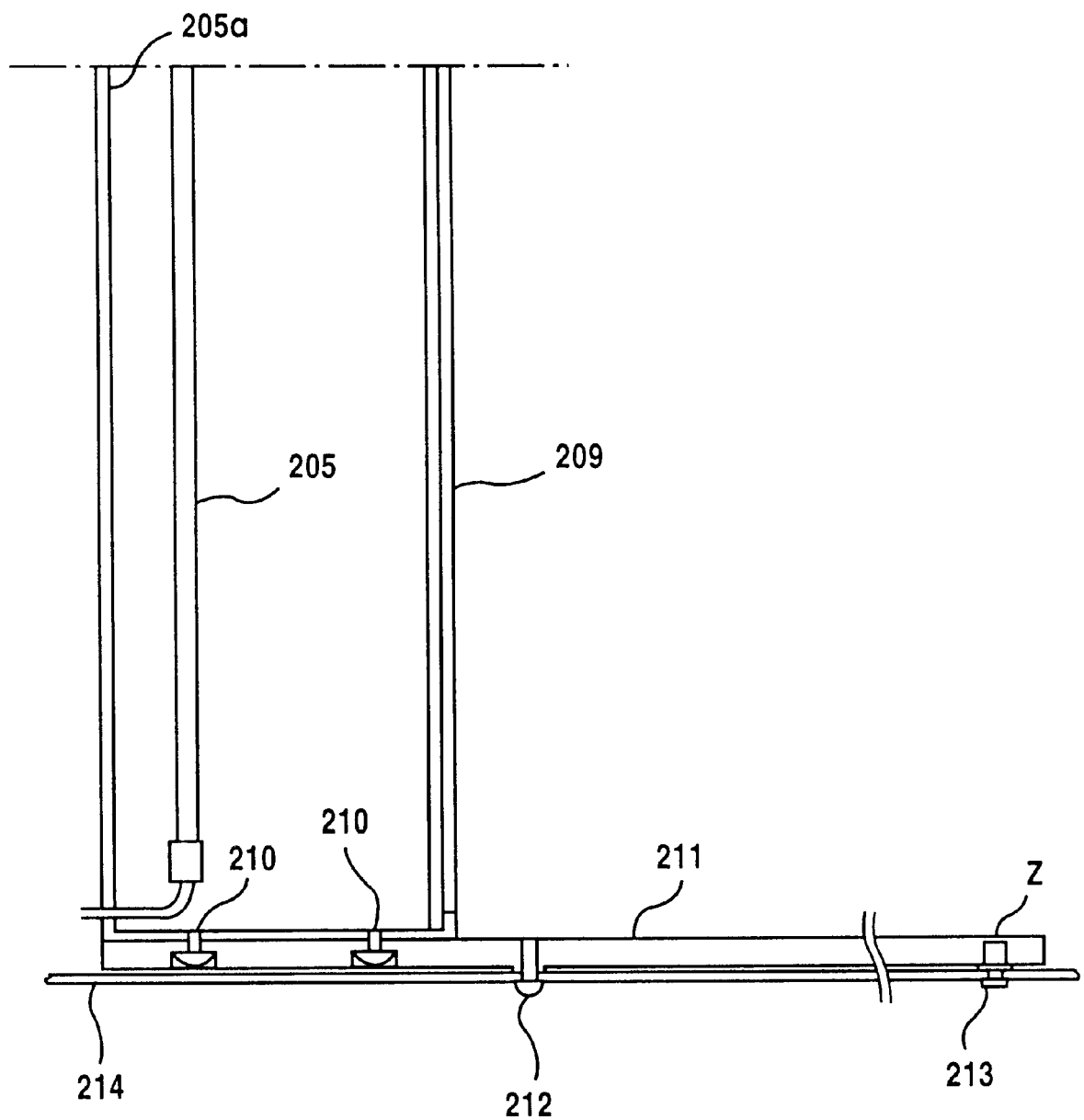
FIG. 36 is a cross-sectional view taken along a line C—C shown in FIG. 35.
Figure 37:
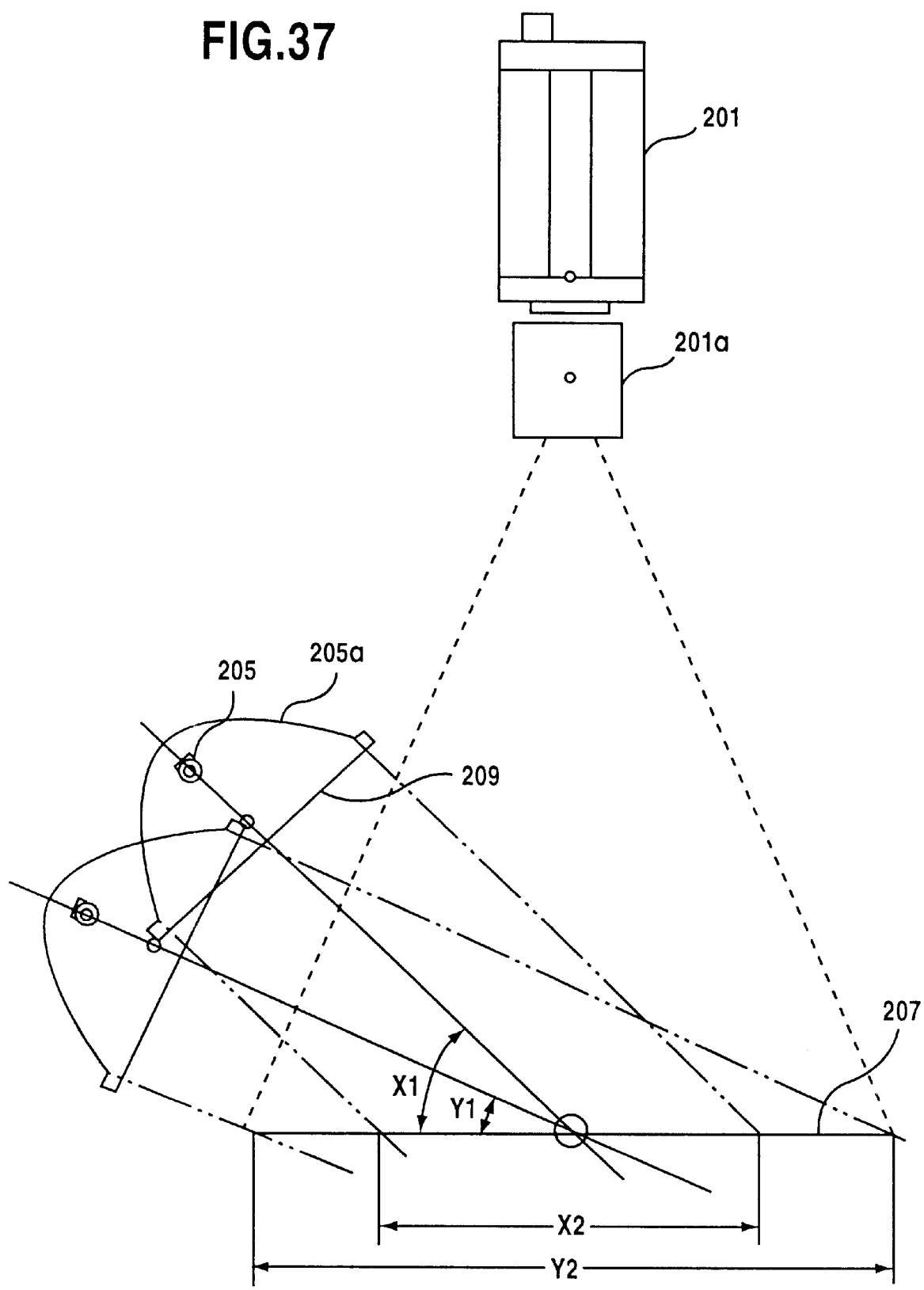
FIG. 37 is a side view showing the relationship between the illuminating angle and the length of illumination.
Figure 38:
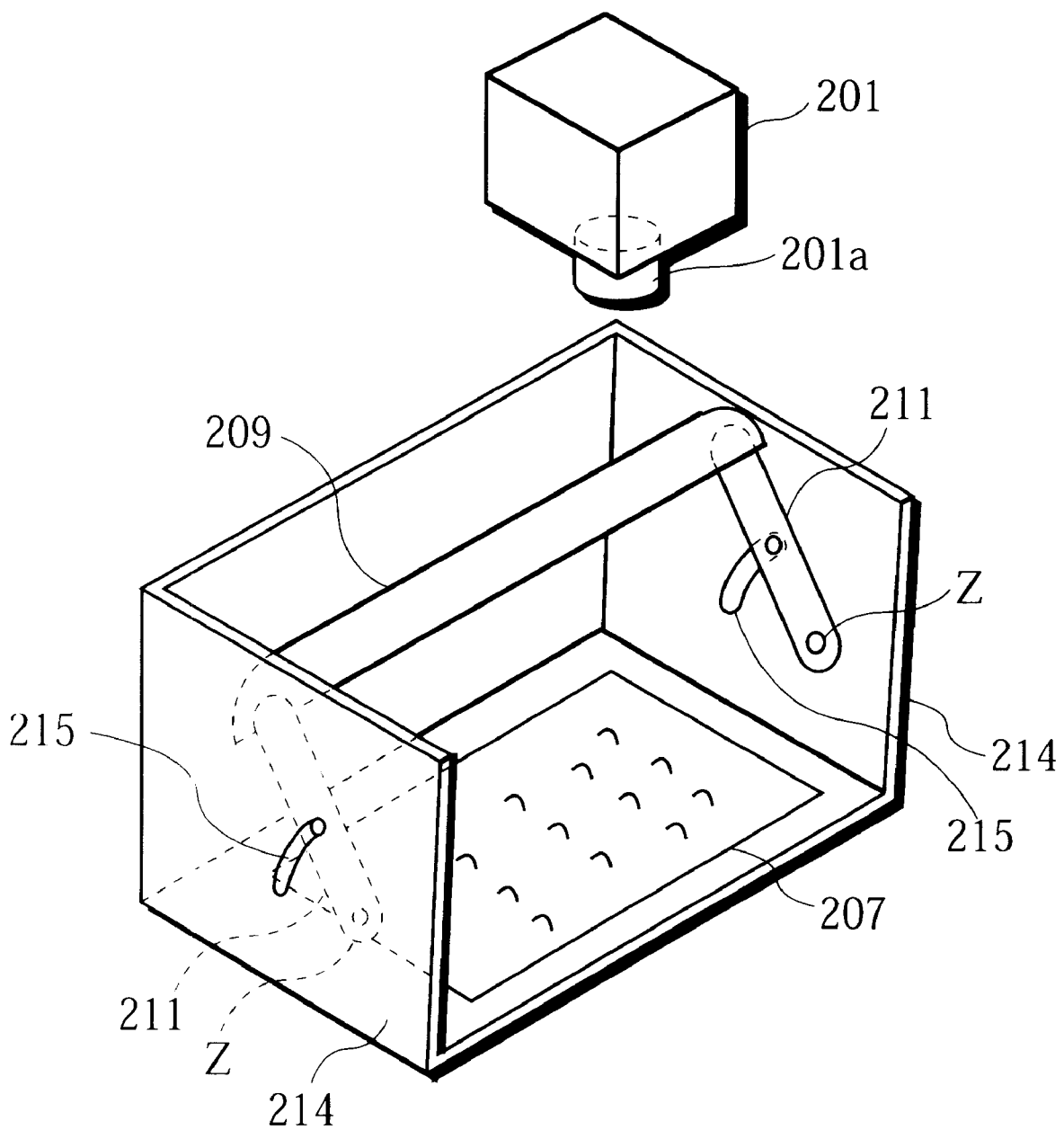
FIG. 38 is a perspective view showing a mechanism for changing the illuminating angle.

FIGS. 35 to 38 illustrate a mechanism for changing the arrangement of the illuminating lamp 205. FIG. 35 is a side view showing the mechanism for changing the arrangement of the illuminating lamp 205, FIG. 36 is a cross-sectional view taken along a line C—C shown in FIG. 35, and FIG. 38 is a perspective view showing the mechanism for changing the arrangement of the illuminating lamp 205. In the drawings, the same sections as those shown in FIG. 32 are assigned the same reference numerals and hence, the description thereof is not repeated.

Reference numeral 201 denotes a camera arranged above an original 207. The camera 201 is arranged downward so that its lens 201a is opposite to the original 207. A pair of side plates 214 is arranged on both sides of the original 207. Adjustable arms 211 are rotatably mounted, respectively, centered around a supporting shaft 213 (a support Z) on the side plates 214. The supporting shaft 213 is so positioned as to coincide with an optical axis of the camera 201 as viewed from the side.

A reflector 205a is fixed to an idling end of the adjustable arm 211 by a fixing screw 210. An illuminating lamp 205 is arranged inside the reflector 205a. A filter 209 for making light uniform is arranged in the reflector 205a so as to close its opening. A side panel 214 is provided with a groove 215. A lock screw 212 guided by the groove 215 and for fixing the adjustable arm 211 to the side panel 214 is mounted on the adjustable arm 211.

Since the angular position in rotation of the adjustable arm 211 can be adjusted according to the above-mentioned mechanisms, the illuminating angle of the original 207 by light can be adjusted, whereby it is possible to set the suitable illuminating angle at which an image corresponding to shadows of braille is obtained. When the most suitable angular position in rotation of the adjustable arm 211 is determined, the adjustable arm 211 is fixed to the side panel 214 by tightening the lock screw 212, whereby the position of the illuminating lamp 205 is fixed.

It is preferable that the illuminating angle is set in the range of Y1=25° and X1=45° with respect to the original 207, as shown in FIG. 37. The area of light directed to the original 207 can be increased depending on the illuminating angle, as shown in FIG. 37, which is efficient. For example, the length of illumination becomes Y2=136.62 mm when the angle is 25°, and the length of illumination is X2=141.42 mm when the angle is 45°.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A braille recognition system comprising:

imaging means for obliquely irradiating light onto the surface of a document in braille and receiving its reflected light, to obtain a gray image;

pattern image producing means for obtaining an image corresponding to a pattern of projected points on the document in braille on the basis of the gray image obtained by the imaging means;

braille image cutting means for cutting an image in braille units from the image corresponding to the pattern of projected points; and braille/code converting means for generating a braille code for each cut image in the braille unit, wherein the pattern image producing means comprises filtering processing means for subjecting the gray image obtained by the imaging means to filtering processing to extract a portion intermediate between a portion onto which light is intensely irradiated at the projected point and a portion where a shadow is formed on the document in braille, and binary-coding processing means for subjecting an image after the filtering processing to binary-coding processing, to obtain a binary-coded image corresponding to the pattern of projected points on the document in braille, wherein when the portion onto which light is intensely irradiated at the projected point and the portion where a shadow is formed on the document in braille are respectively defined as the upper side and the lower side on the gray image obtained by the imaging means, said filtering processing means converts the density value of a target pixel into a value obtained by subtracting the density value of a pixel directly above the target pixel from the density value of a pixel directly below the target pixel.

2. The braille recognition system according to claim 1, wherein the braille image cutting means comprises projection processing means for subjecting the image corresponding to the pattern of projected points to projection processing, information extracting means for extracting information relating to the length and the breadth of each of the braille units and information relating to the position of each of the braille units on the basis of the results of the projection processing by the projection processing means, and means for cutting an image in braille units from the image corresponding to the pattern of projected points on the basis of the extracted information.

3. The braille recognition system according to claim 2, wherein the projection processing means comprises means for performing projection processing in a first direction which is the same as the direction in which braille is read in the image corresponding to the pattern of projected points, and means for performing projection processing in a direction perpendicular to the direction in which braille is read in the image corresponding to the pattern of projected points.

4. A braille recognition system comprising:

imaging means for obliquely irradiating light onto the surface of a document in braille and receiving its reflected light, to obtain a gray image;

pattern image producing means for obtaining an image corresponding to a pattern of projected points on the document in braille on the basis of the gray image obtained by the imaging means;

braille image cutting means for cutting an image in braille units from the image corresponding to the pattern of projected points; and braille/code converting means for generating a braille code for each cut image in the braille unit, wherein the braille/code converting means comprises judging means for dividing the cut image in the braille unit into a plurality of regions where a projected point can be formed and judging the presence or absence of a projected point for each region obtained by the division, and code generating means for generating a braille code corresponding to the cut image in the braille unit on the basis of the results of the judgement of the presence or absence of a projected point for each region obtained by the division and a weighting factor previously determined for each region obtained by the division, wherein the judging means judges the presence or absence of a projected point for each region obtained by the division on the basis of the number of significant pixels in the region obtained by the division or the number of significant pixels in a small region set in the region obtained by the division.

5. A braille recognition system comprising:

imaging means for obliquely irradiating light onto one surface of a document in braille having braille printed on both its surfaces and receiving its reflected light, to obtain a gray image;

pattern image producing means for producing an image corresponding to a pattern of projected points on the surface onto which light is irradiated out of both the surfaces of the document in braille and an image corresponding to a pattern of projected points on the reverse surface of the document in braille which appear as recessed points on the surface of the document in braille;

braille image cutting means for cutting, for each image corresponding to the pattern of projected points on the surface of the document in braille and image corresponding to the pattern of projected points on the reverse surface of the document in braille, an image in braille units from the obtained images corresponding to the pattern of projected points; and braille/code converting means for generating a braille code for each image in the braille unit cut on the basis of the image corresponding to the pattern of projected points on the surface of the document in braille to generate a braille code corresponding to the braille on the surface, and generating a braille code for each image in the braille unit cut on the basis of the image corresponding to the pattern of projected points on the reverse surface of the document in braille to generate a braille code corresponding to the braille on the reverse surface, wherein the pattern image producing means comprises first image producing means for producing an image corresponding to a pattern of projected points on the surface of the document in braille and second image producing means for producing an image corresponding to a pattern of projected points on the reverse surface of the document in braille which appear as recessed points on the surface of the document in braille, the first image producing means comprising first filtering processing means for subjecting the gray image obtained by the imaging means to first filtering processing, to extract a portion intermediate between a portion onto which light is intensely irradiated at the projected point and a portion where a shadow is formed on the surface of the document in braille to produce an image for extracting projected points, second filtering processing means for subjecting the gray image obtained by the imaging means to second filtering processing, to extract a portion intermediate between a portion onto which light is intensely irradiated at the recessed point and a portion where a shadow is formed on the surface of the document in braille to produce an image for extracting recessed points, first binary-coding processing means for subjecting the image for extracting projected points to binary-coding processing using a relatively loose threshold value, to produce a first binary-coded image, second binary-coding processing means for subjecting the image for extracting recessed points to binary-coding processing using a relatively strict threshold value, to produce a second binary-coded image, expansion processing means for subjecting the second binary-coded image to expansion processing, to produce a binary-coded image whose recessed point portions are expanded, reversal processing means for subjecting the binary-coded image whose recessed point portions are expanded to black-and-white reversal processing, to produce a first mask image, and means for calculating the logical product between the first binary-coded image and the first mask image, to produce the image corresponding to the pattern of projected points on the surface of the document in braille, and the second image producing means comprising first filtering processing means for subjecting the gray image obtained by the imaging means to first filtering processing, to extract a portion intermediate between a portion onto which light is intensely irradiated at the projected point and a portion where a shadow is formed on the surface of the document in braille to produce an image for extracting projected points, second filtering processing means for subjecting the gray image obtained by the imaging means to second filtering processing, to extract a portion intermediate between a portion onto which light is intensely irradiated at the recessed point and a portion where a shadow is formed on the surface of the document in braille to produce an image for extracting recessed points, third binary-coding processing means for subjecting the image for extracting recessed points to binary-coding processing using a relatively loose threshold value, to produce a third binary-coded image, fourth binary-coding processing means for subjecting the image for extracting projected points to binary-coding processing using a relatively strict threshold value, to produce a fourth binary-coded image, expansion processing means for subjecting the fourth binary-coded image to expansion processing, to produce a binary-coded image whose projected point portions are expanded, reversal processing means for subjecting the binary-coded image whose projected point portions are expanded to black-and-white reversal processing, to produce a second mask image, and means for calculating the logical product between the third binary-coded image and the second mask image, to produce the image corresponding to the pattern of projected points on the reverse surface of the document in braille.

6. The braille recognition system according to claim 5, wherein said first filtering processing means converts the density value of a target pixel into a value obtained by subtracting the density value of a pixel directly above the target pixel from the density value of a pixel directly below the target pixel when the portion onto which light is intensely irradiated at the projected point and the portion where a shadow is formed on the surface of the document in braille are respectively defined as the upper side and the lower side on the gray image obtained by the imaging means, and said second filtering processing means converts the density value of a target pixel into a value obtained by subtracting the density value of a pixel directly below the target pixel from the density value of a pixel directly above the target pixel when the portion onto which light is intensely irradiated at the recessed point and the portion where a shadow is formed on the surface of the document in braille are respectively defined as the lower side and the upper side on the gray image obtained by the imaging means.

7. A braille recognition system comprising:

imaging means for obliquely irradiating light onto one surface of a document in braille having braille printed on both its surfaces and receiving its reflected light, to obtain a gray image;

pattern image producing means for producing an image corresponding to a pattern of projected points on the surface onto which light is irradiated out of both the surfaces of the document in braille and an image corresponding to a pattern of projected points on the reverse surface of the document in braille which appear as recessed points on the surface of the document in braille;

braille image cutting means for cutting, for each image corresponding to the pattern of projected points on the surface of the document in braille and image corresponding to the pattern of projected points on the reverse surface of the document in braille, an image in braille units from the obtained images corresponding to the pattern of projected points; and braille/code converting means for generating a braille code for each image in the braille unit cut on the basis of the image corresponding to the pattern of projected points on the surface of the document in braille to generate a braille code corresponding to the braille on the surface, and generating a braille code for each image in the braille unit cut on the basis of the image corresponding to the pattern of projected points on the reverse surface of the document in braille to generate a braille code corresponding to the braille on the reverse surface, wherein the braille image cutting means comprises projection processing means for subjecting the image corresponding to the pattern of projected points to projection processing, information extracting means for extracting information relating to the length and the breadth of each of the braille units and information relating to the position of each of the braille units on the basis of the results of the projection processing by the projection processing means, and means for cutting an image in braille units from the image corresponding to the pattern of projected points on the basis of the extracted information, wherein the information extracting means comprises means for extracting information relating to the length and the breadth of each of the braille units, the pitch in the horizontal direction between the braille units, the pitch in the vertical direction between the braille units, and the positions of the braille units at four corners on the basis of the results of the projection processing by the projection processing means, means for calculating information relating to the positions of all the braille units on the basis of the information relating to the positions of the braille units at four corners, the pitch in the horizontal direction between the braille units, and the pitch in the vertical direction between the braille units, and means for correcting the information relating to the calculated positions of all the braille units on the basis pos a position conversion table previously produced in order to correct the optical distortion of the imaging means.

8. A braille recognition system comprising:

imaging means for obliquely irradiating light onto one surface of a document in braille having braille printed on both its surfaces and receiving its reflected light, to obtain a gray image;

pattern image producing means for producing an image corresponding to a pattern of projected points on the surface onto which light is irradiated out of both the surfaces of the document in braille and an image corresponding to a pattern of projected points on the reverse surface of the document in braille which appear as recessed points on the surface of the document in braille;

braille image cutting means for cutting, for each image corresponding to the pattern of projected points on the surface of the document in braille and image corresponding to the pattern of projected points on the reverse surface of the document in braille, an image in braille units from the obtained images corresponding to the pattern of projected points; and braille/code converting means for generating a braille code for each image in the braille unit cut on the basis of the image corresponding to the pattern of projected points on the surface of the document in braille to generate a braille code corresponding to the braille on the surface, and generating a braille code for each image in the braille unit cut on the basis of the image corresponding to the pattern of projected points on the reverse surface of the document in braille to generate a braille code corresponding to the braille on the reverse surface, wherein the braille/code converting means comprises
judging means for dividing the cut image in the braille unit into a plurality of regions where a projected point can be formed and judging the presence or absence of a projected point for each region obtained by the division, and code generating means for generating a braille code corresponding to the cut image in the braille unit on the basis of the results of the judgement of the presence or absence of a projected point for each region obtained by the divisional and a weighting factor previously determined for each region obtained by the division, wherein
the judging means judges the presence or absence of a projected point for each region obtained by the division on the basis of the number of significant pixels in the region obtained by the division and the number of significant pixels in a small region set in the region obtained by the division.

9. A braille copying apparatus comprising:

imaging means for obliquely irradiating light onto the surface of a document in braille and receiving its reflected light, to obtain a gray image;

pattern image producing means for obtaining an image corresponding to a pattern of projected points on the document in braille on the basis of the gray image obtained by the imaging means;

braille image cutting means for cutting an image in braille units from the image corresponding to the pattern of projected points;

braille/code converting means for generating a braille code for each cut image in the braille unit; and braille document producing means for producing a document in braille on the basis of the generated braille code, wherein the pattern imaging producing means comprises
filtering processing means for subjecting the gray image obtained by the imaging means to filtering processing, to extract a portion intermediate between a portion onto which light is intensely irradiated at the projected point and a portion where a shadow is formed on the document in braille, and binary-coding processing means for subjecting an image after the filtering. processing to binary-coding processing to obtain a binary-coded image corresponding to the pattern of projected points on the document in braille, wherein
when the portion onto which light is intensely irradiated at the projected point and the portion where a shadow is formed on the document in braille are respectively defined as the upper side and the lower side on the gray image obtained by the imaging means, said filtering processing means converts the density value of a target pixel into a value obtained by subtracting the density value of a pixel directly above the target pixel from the density value of a pixel directly below the target pixel.

10. A braille copying apparatus comprising:

imaging means for obliquely irradiating light onto the surface of a document in braille and receiving its reflected light, to obtain a gray image;

pattern image producing means for obtaining an image corresponding to a pattern of projected points on the document in braille on the basis of the gray image obtained by the imaging means;

braille image cutting means for cutting an image in braille units from the image corresponding to the pattern of projected points;

braille/code converting means for generating a braille code for each cut image in the braille unit; and braille document producing means for producing a document in braille on the basis of the generated braille code, wherein the pattern imaging producing means comprises
filtering processing means for subjecting the gray image obtained by the imaging means to filtering processing, to extract a portion intermediate between a portion onto which light is intensely irradiated at the projected point and a portion where a shadow is formed on the document in braille, and binary-coding processing means for subjecting an image after the filtering processing to binary-coding processing to obtain a binary-coded image corresponding to the pattern of projected points on the document in braille, wherein the braille/code converting means comprises
judging means for dividing the cut image in the braille unit into a plurality of regions where a projected point can be formed and judging the presence or absence of a projected point for each region obtained by the division, and code generating means for generating a braille code corresponding to the cut image in the braille unit on the basis of the results of the judgement of the presence or absence of a projected point for each region obtained by the division and a weighting factor previously determined for each region obtained by the division, wherein the judging means judges the presence or absence of a projected point for each region obtained by the division on the basis of the number of significant pixels in the region obtained by the division or the number of significant pixels in a small region set in the region obtained by the division.

11. A braille copying apparatus, comprising;

imaging means for obliquely irradiating light onto one surface of a document in braille having braille printed on both its surfaces and for receiving its reflected light, to obtain a gray image;

pattern image producing means for producing an image corresponding to a pattern of projected points on the surface onto which light is irradiated out of both the surfaces of the document in braille and an image corresponding to a pattern of projected points on the reverse surface of the document in braille which appear as recessed points on the surface of the document in braille;

braille image cutting means for cutting, for each image corresponding to the pattern of projected points on the surface of the document in braille and image corresponding to the pattern of projected points on the reverse surface of the document in braille, an image in braille units from the obtained images corresponding to the pattern of projected points;

braille/code converting means for generating a braille code for each image in the braille unit cut on the basis of the image corresponding to the pattern of projected points on the surface of the document in braille to generate a braille code corresponding to the braille on the surface, and generating a braille code for each image in the braille unit cut on the basis of the image corresponding to the pattern of projected points on the reverse surface of the document in braille to generate a braille code corresponding to the braille on the reverse surface; and braille document producing means for producing a document in braille on the basis of the generated braille code corresponding to the braille on the surface, and producing a document in braille on the basis of the generated braille code corresponding to the braille on the reverse surface, wherein producing an image corresponding to a pattern of projected points on the surface of the document in braille and second image producing means for producing an image corresponding to a pattern of projected points on the reverse surface of the document in braille which appear as recessed points on the surface of the document in braille, the first image producing means comprising first filtering processing means for subjecting the gray image obtained by the imaging means to first filtering processing, to extract a portion intermediate between a portion onto which light is intensely irradiated at the projected point and a portion where a shadow is formed on the surface of the document in braille to produce an image for extracting projected points, second filtering processing means for subjecting the gray image obtained by the imaging means to second filtering processing, to extract a portion intermediate between a portion onto which light is intensely irradiated at the recessed point and a portion where a shadow is formed on the surface of the document in braille to produce an image for extracting recessed points, first binary-coding processing means for subjecting the image for extracting projected points to binary-coding processing using a relatively loose threshold value, to produce a first binary-coded image, second binary-coding processing means for subjecting the image for extracting recessed points to binary-coding processing using a relatively strict threshold value, to produce a second binary-coded image, expansion processing means for subjecting the second binary-coded image to expansion processing, to produce a binary-coded image whose recessed point portions are expanded, reversal processing means for subjecting the binary-coded image whose recessed point portions are expanded to black-and-white reversal processing, to produce a first mask image, and means for calculating the logical product between the first binary-coded image and the first mask image, to produce an image corresponding to the pattern of projected points on the surface of the document in braille, and the second image producing means comprising first filtering processing means for subjecting the gray image obtained by the imaging means to first filtering processing, to extract a portion intermediate between a portion onto which light is intensely irradiated at the projected point and a portion where a shadow is formed on the surface of the document in braille to produce an image for extracting projected points, second filtering processing means for subjecting the gray image obtained by the imaging means to second filtering processing, to extract a portion intermediate between a portion onto which light is intensely irradiated at the recessed point and a portion where a shadow is formed on the surface of the document in braille to produce an image for extracting recessed points, third binary-coding processing means for subjecting the image for extracting recessed points to binary-coding processing using a relatively loose threshold value, to produce a third binary-coded image, fourth binary-coding processing means for subjecting the image for extracting projected points to binary-coding processing using a relatively strict threshold value, to produce a fourth binary-coded image, expansion processing means for subjecting the fourth binary-coded image to expansion processing, to produce a binary-coded image whose projected point portions are expanded, reversal processing means for subjecting the binary-coded image whose projected point portions are expanded to black-and-white reversal processing, to produce a second mask image, and means for calculating the logical product between the third binary-coded image and the second mask image, to produce an image corresponding to the pattern of projected points on the reverse surface of the document in braille.

12. A braille copying apparatus, comprising:

imaging means for obliquely irradiating light onto one surface of a document in braille having braille printed on both its surfaces and for receiving its reflected light, to obtain a gray image;

pattern image producing means for producing an image corresponding to a pattern of projected points on the surface onto which light is irradiated out of both the surfaces of the document in braille and an image corresponding to a pattern of projected points on the reverse surface of the document in braille which appear as recessed points on the surface of the document in braille;

braille image cutting means for cutting, for each image corresponding to the pattern of projected points on the surface of the document in braille and image corresponding to the pattern of projected points on the reverse surface of the document in braille, an image in braille units from the obtained images corresponding to the pattern of projected points;

braille/code converting means for generating a braille code for each image in the braille unit cut on the basis of the image corresponding to the pattern of projected points on the surface of the document in braille to generate a braille code corresponding to the braille on the surface, and generating a braille code for each image in the braille unit cut on the basis of the image corresponding to the pattern of projected points on the reverse surface of the document in braille to generate a braille code corresponding to the braille on the reverse surface; and braille document producing means for producing a document in braille on the basis of the generated braille code corresponding to the braille on the surface, and producing a document in braille on the basis of the generated braille code corresponding to the braille on the reverse surface, wherein said first filtering processing means converts the density value of a target pixel into a value obtained by subtracting the density value of a pixel directly above the target pixel from the density value of a pixel directly below the target pixel when the portion onto which light is intensely irradiated at the projected point and the portion where a shadow is formed on the surface of the document in braille are respectively defined as the upper side and the lower side on the gray image obtained by the imaging means, and said second filtering processing means converts the density value of a target pixel into a value obtained by subtracting the density value of a pixel directly below the target pixel from the density value of a pixel directly above the target pixel when the portion onto which light is intensely irradiated at the recessed point and the portion where a shadow is formed on the surface of the document in braille are respectively defined as the lower side and the upper side on the gray image obtained by the imaging means.

13. A braille copying apparatus, comprising:

imaging means for obliquely irradiating light onto one surface of a document in braille having braille printed on both its surfaces and for receiving its reflected light, to obtain a gray image;

pattern image producing means for producing an image corresponding to a pattern of projected points on the surface onto which light is irradiated out of both the surfaces of the document in braille and an image corresponding to a pattern of projected points on the reverse surface of the document in braille which appear as recessed points on the surface of the document in braille;

braille image cutting means for cutting, for each image corresponding to the pattern of projected points on the surface of the document in braille and image corresponding to the pattern of projected points on the reverse surface of the document in braille, an image in braille units from the obtained images corresponding to the pattern of projected points;

braille/code converting means for generating a braille code for each image in the braille unit cut on the basis of the image corresponding to the pattern of projected points on the surface of the document in braille to generate a braille code corresponding to the braille on the surface, and generating a braille code for each image in the braille unit cut on the basis of the image corresponding to the pattern of projected points on the reverse surface of the document in braille to generate a braille code corresponding to the braille on the reverse surface; and braille document producing means for producing a document in braille on the basis of the generated braille code corresponding to the braille on the surface, and producing a document in braille on the basis of the generated braille code corresponding to the braille on the reverse surface, wherein the braille/code converting means comprises judging means for dividing the cut image in the braille unit into a plurality of regions where a projected point can be formed and judging the presence or absence of a projected point for each region obtained by the division, and code generating means for generating a braille code corresponding to the cut image in the braille unit on the basis of the results of the judgement of the presence or absence of a projected point for each region obtained by the division and a weighting factor previously determined for each region obtained by the division, wherein the judging means judges the presence or absence of a projected point for each region obtained by the division on the basis of the number of significant pixels in the region obtained by the division or the number of significant pixels in a small region set in the region obtained by the division.

* * * * *